(12) United States Patent
Matsushima et al.

(10) Patent No.: US 6,581,250 B2
(45) Date of Patent: Jun. 24, 2003

(54) STRING FASTENING DEVICE AND CLOTH TO WHICH THE DEVICE IS ATTACHED

(75) Inventors: Hideyuki Matsushima, Toyama-ken (JP); Hisashi Yoneshima, Toyama-ken (JP); Yoshio Takamura, Toyama-ken (JP); Koji Yamagishi, Toyama-ken (JP)

(73) Assignee: YKK Corporation, Tokyo (JP)

( * ) Notice: Subject to any disclaimer, the term of this patent is extended or adjusted under 35 U.S.C. 154(b) by 46 days.

(21) Appl. No.: 09/771,641

(22) Filed: Jan. 30, 2001

(65) Prior Publication Data

US 2001/0010110 A1 Aug. 2, 2001

(30) Foreign Application Priority Data

Jan. 31, 2000 (JP) ............................... 2000-022694
Nov. 30, 2000 (JP) ............................... 2000-365686

(51) Int. Cl.⁷ .......................... A44B 1/04; B63B 21/04; F16G 11/00
(52) U.S. Cl. .............................. 24/130; 24/16 R; 24/18; 24/129 R; 24/129 A; 114/218
(58) Field of Search ................... 24/130, 18, 129 R, 24/129 A, 129 W, 716, 115 H, 115 K, 66.9, 3.1, 3.13, 459, 481, 482, 480, 477, 478; 114/218

(56) References Cited

U.S. PATENT DOCUMENTS

| | | | | |
|---|---|---|---|---|
| 74,070 A | * | 2/1868 | Fletcher | 24/130 |
| 1,909,561 A | * | 5/1933 | Abraham | 24/459 |
| 2,503,327 A | * | 4/1950 | Fields | 24/130 |
| 2,637,591 A | * | 5/1953 | Maxfield et al. | 294/74 |
| 2,802,249 A | * | 8/1957 | Kulp | 24/130 |
| 3,066,372 A | * | 12/1962 | Parker | 24/130 |
| 3,374,509 A | * | 3/1968 | Logan et al. | 24/129 R |
| 3,530,543 A | * | 9/1970 | Desmarais et al. | 24/16 R |
| 4,010,503 A | * | 3/1977 | Denton | 24/16 PB |
| 4,178,661 A | * | 12/1979 | Klein | 24/130 |
| 4,248,401 A | * | 2/1981 | Mittleman | 24/130 |
| 5,119,539 A | * | 6/1992 | Curry | 24/712.1 |
| 5,339,884 A | * | 8/1994 | Angerman | 24/716 |
| 6,163,936 A | * | 12/2000 | Benoit | 24/130 |

* cited by examiner

*Primary Examiner*—Victor Sakran
(74) *Attorney, Agent, or Firm*—Finnegan, Henderson, Farabow, Garrett & Dunner, L.L.P.

(57) ABSTRACT

The present invention provides a string fastening device which allows a string to be threaded thereinto easily, facilitates tightening of the string and enables the string to be gripped softly and captured accurately. The string fastening device can be used with its main body only and the main body includes a penetrating hole comprised of a sliding passage portion which allows the string to be moved freely and a braking passage portion for restricting movement of the string such that they adjoin. A narrow portion is provided at a joint portion so as to prevent the string from changing its path freely. The main body is made of thermoplastic elastomer to have elasticity. A rear face of the main body is formed to be a flat face. An attachment groove or sewing holes for sewing operation are provided around the penetrating hole. The main body is placed on a string threading hole in the cloth to be attached by a sewing thread to be fixed securely.

16 Claims, 23 Drawing Sheets

STRING FASTENING DEVICE AND CLOTH TO WHICH THE DEVICE IS ATTACHED

BACKGROUND OF THE INVENTION

1. Field of the Invention

The present invention relates to a string fastening device for tightening and fastening a string threaded along the periphery of sleeve, waist, collar, and hood of ski wear, quilted down jacket with hood, half coat and the like, a string fastening device generally called code stopper, which is provided at an end of a tightening string and allows adjustment of tightening of the string and a cloth to which the string fastening device is attached at a mouth of the threading hole and allows tightening of the string.

2. Description of the Related Art

According to a conventional string fastening device disclosed in Japanese Utility Model Publication No. 47-5867, as shown in FIG. 40, a hole 4' is made in the center of a thin metal plate so that a round string S' or the like can be threaded thereinto. Engaging holes 5' having a peripheral portion formed with uneven surface are punched out in the same diameter as or a slightly smaller diameter than that of the round string, next to this hole 4' to be continuous.

Further, according to Japanese Patent Laid-Open Publication No. 9-252813, as shown in FIG. 41, a tapered penetrating hole 3' is made in the center of a string fastener main body 1' formed by injection molding using elastic material such as mild synthetic resin and rubber, so that it allows a string threaded into this penetrating hole 3' to move in a single direction with respect to the string fastener main body 1', while a large resistance is applied if the string is moved in an opposite direction.

Further, according to Japanese Patent Laid-Open Publication No. 9-56420, in a string fastening device having a string braking passage portion 5" in the center, a front main body 1" having a restricting piece 9", which is provided around the string braking passage portion 5" and deformable by resistance generated when the string passes the passage portion, is made of elastic member such as urethane rubber and flexible plastic. The front main body 1" is circular in its plan view and an ornament portion having unevenness such as a letter, graphic or the like is formed on the surface of the main front body 1". A crimping cylindrical leg 30" formed by punching out thin stainless sheet has a jaw 31" to be buried at an end thereof. Then, with the center of the crimping cylindrical leg 30"0 coinciding with the center of the braking passage portion 5", the jaw 31" is buried in the front main body 1" such that the crimping cylindrical leg 30" is protruded from the center of the rear face of the front main body 1". A rear body 2" of this fastening device is formed by punching out a stainless sheet into a ring shape having a center hole in which the crimping cylindrical leg 30" can be inserted.

As for the string fastening device shown in FIG. 40, the string passage portion hole is formed in the center of the thin metal plate and engaging holes having an unevenness on the periphery thereof are made beside this hole such that they adjoin. During use, the unevenness bites into the string so as to prevent it from slipping out. Because of the thin metal sheet, if the unevenness of the engaging hole bites into the string more firmly than expected and then the string is pulled to tighten with a strong pressure, the string may be damaged. Thus, this fastening device cannot be adjusted accurately in tightening force and cannot be used for a long term.

In the string fastening device shown in FIG. 41, its main body is formed of elastic material such as mild synthetic resin and rubber. Because the main body is likely to be elastically deformed through a cut-in portion disposed in a tapered face of a penetrating hole provided therein, a string threaded into the fastening body can move in an opposite direction as well as in a predetermined direction. Adjustment of the tightening of the string is carried out by this single penetrating hole. Therefore, this string fastening device has such a problem that the main body is likely to be loosened during use so that it may lose its tightening function. In case of attaching the main body to an article by sewing, an accurate sewing is hardly realized because of lack of any guide groove for sewing. Further, even if the main body is made of elastic material, a sewing thread exposes on the surface so that it would get worn out.

The string adjustment fastening device shown in FIG. 42 is formed of elastic member such as urethane rubber and resin. A braking passage portion is provided in the center thereof and a braking piece which is bent and deformed by a passage portion resistance of the string is disposed on the periphery of the braking passage portion. The braking piece is protruded into the braking passage portion in a tongue shape. Even if the string is moved in either forward and backward, movement of the string is stopped by the bending and deformation of the braking piece with pressure. Thus, the string is likely to be loosened during use so that the adjustment of the tightening is instable. In order to attach the fastening adjustment device to a cloth, the crimping cylindrical leg formed by punching a stainless sheet and then pressing is buried integrally in the main body of the elastic member and this crimping cylindrical leg is crimped to the rear fastening body made of stainless. Therefore, the adjustment fastening device is composed of the elastic member and the crimping cylindrical leg made of stainless. Then, this adjustment fastening device must be buried. Thus, there is such a problem that production of the fastening device is very troublesome and the components cannot be recycled.

SUMMARY OF THE INVENTION

Accordingly, the present invention has been achieved in views of the above described problems. An object of the invention is to provide a string fastening device whose main body has a penetrating hole in which a string can be threaded, the penetrating hole being comprised of a passage portion allowing the string to pass freely and a passage portion for restricting movement of the string, the string fastening device having a structure facilitating adjustment operation of tightening of the string and capable of gripping and capturing the string securely and bearing a long term use. Further, this string fastening device can be produced easily.

Another object of the invention is to provide a cloth to which a string fastening device is attached, the string fastening device including a penetrating hole being comprised of a passage portion allowing the string to pass freely and a passage portion for restricting movement of the string so that adjustment operation of fastening of the string can be done easily, the fastening device being able to be attached to the cloth only with a main body thereof.

Another object of the invention is to provide a string fastening device having a structure with which the main body can grip and capture the string reliably and easily.

Another object of the invention is to provide a string fastening device in which the string is not permitted to change its path except intentionally between a passage portion allowing the string to be moved freely and a passage portion for restricting movement of the string, so as to distinguish the sliding of the string from the braking function clearly.

Another object of the invention is to provide a string fastening device having a passage portion for restricting movement of the string, having a shape suitable for the string depending on material and shape of the string upon use of the string fastening device.

Another object of the invention is to provide a string fastening device having a passage portion capable of holding the string in an excellent tightening condition and restricting movement of the string effectively and appropriately.

Another object of the invention is to provide a string fastening device, which is comprised of a main body and a fastening body so that the string fastening device can be attached easily to cloth and which has a structure by which the main body and the fastening body can be connected securely.

Another object of the invention is to provide a string fastening device allowing the main body and the fastening body to be connected with each other effectively and fixed strongly thereby securing an excellent durability for a long term use.

Another object of the present invention is to provide a string fastening device in which, upon attachment to cloth, yarns existing on an edge of a string threading hole of the cloth are prevented from going into the penetrating hole for the string, thereby realizing effective adjustment operation with a good appearance.

Another object of the invention is to provide a string fastening device in which a main body can be used solely and the main body can be attached to a cloth of an article in a stable condition by sewing so that the main body can be used as the string fastening device.

Another object of the invention is to provide a string fastening device in which a main body of the string fastening device is prevented from moving as the main body bites into the cloth, at the time of attaching the main body to the article by sewing.

Another object of the invention is to provide a string fastening device in which elasticity is provided to a passage portion for restricting the movement of the string in the main body of the fastening device, so as to restrict the movement of the string by pressing resiliently.

Another object of the invention is to provide a string fastening device which can be produced easily and is capable of achieving recycle of products by limiting material thereof to thermoplastic resin.

Another object of the invention is to provide a string fastening device in which a main body itself is provided with elasticity, the string is prevented from being worn out and a flexible touch is realized, by limiting a material of the main body of the string fastening device to thermoplasitc elastomer.

To achieve the above described objects, according to the first aspect of the invention, there is provided a string fastening device, including a main body having a penetrating hole in which a string is capable of being threaded and which is comprised of a sliding passage portion allowing the string to be moved freely and a braking passage portion for restricting motion of the string such that they adjoin each other. An inner face of the braking passage portion is formed in a tapered face narrowing gradually. And an engaging portion having a section of an acute angle is formed at an edge of the tapered face.

Also preferably, a narrow portion is formed at a joint portion between the sliding passage portion and the braking passage portion provided in the main body by narrowing an entrance of the braking passage portion.

Preferably, the sliding passage portion provided in the main body is formed in a circular shape in its plan view and the braking passage portion is formed in an oval shape having a smaller width than that of the sliding passage portion in its plan view. Alternatively, the sliding passage portion provided in the main body is formed in a large circle in its plan view and the braking passage portion is formed in a circle smaller than that of the sliding passage portion in its plan view.

Preferably, a concave stepped portion is provided outside the engaging portion provided on an edge of the braking passage portion by enlarging the braking passage portion so that the engaging portion is disposed halfway of the braking passage portion.

Preferably, the string fastening device includes the main body and a fastening body to be connected with the main body with the engaging portion located outside. The fastening body has a through hole communicating with the penetrating hole in the main body. Attaching posts are provided on any one of opposing faces of the main body and the fastening body. And attaching holes are made in the other one so that the attaching posts engages.

Preferably, plural small protrusions are disposed on opposing faces around the attaching posts and attaching holes provided in the main body and the fastening body such that the small protrusions provided on both sides stagger from each other.

Also preferably, plural coupling protrusions provided on the opposing faces of the main body and the fastening body are formed such that they stagger from each other. Alternatively, plural convex portions and concave portions are formed on opposing faces of the main body and the fastening body in a complementary manner.

Preferably, a protruded row is provided along a periphery of the through hole provided in the fastening body such that it is protruded against the main body.

Preferably, small holes are formed in the vicinity of the braking passage portion formed in the main body so as to provide elasticity to the braking passage portion. Alternatively, a plurality of elastic pieces are provided to protrude from inner face of the braking passage portion formed in the main body so as to provide flexibility.

Also preferably, the main body and the fastening body thereof are formed by injection molding or extrusion molding using thermoplastic resin.

According to the second aspect of the invention, there is provided a cloth to which a string fastening device is attached, the string fastening device including a main body having a sliding passage portion allowing a string to be moved freely and a braking passage portion for restricting motion of the string such that they adjoin each other. The cloth has a string threading hole which corresponds in position to the sliding passage portion and braking passage portion.

The foregoing features of the first aspect may be incorporated in the cloth of the second aspect of the invention also.

And preferably, an engaging portion is formed in an inner face of the braking passage portion provided in the main body.

Also preferably, a rear face of the main body is formed to be a flat face and either sewing holes and/or an attachment groove for sewing operation are provided on a front face of the main body outside of the sliding passage portion and the braking passage portion.

Further preferably, a protruding portion for preventing displacement is provided to protrude from the flat face on the rear face of the main body.

Still preferably, the main body is formed of elastomer so as to provide elasticity to the main body.

DESCRIPTION OF THE PREFERRED EMBODIMENTS

Hereinafter, the preferred embodiments of the string fastening device of the present invention will be described in detail with reference to the accompanying drawings.

Figure 9:
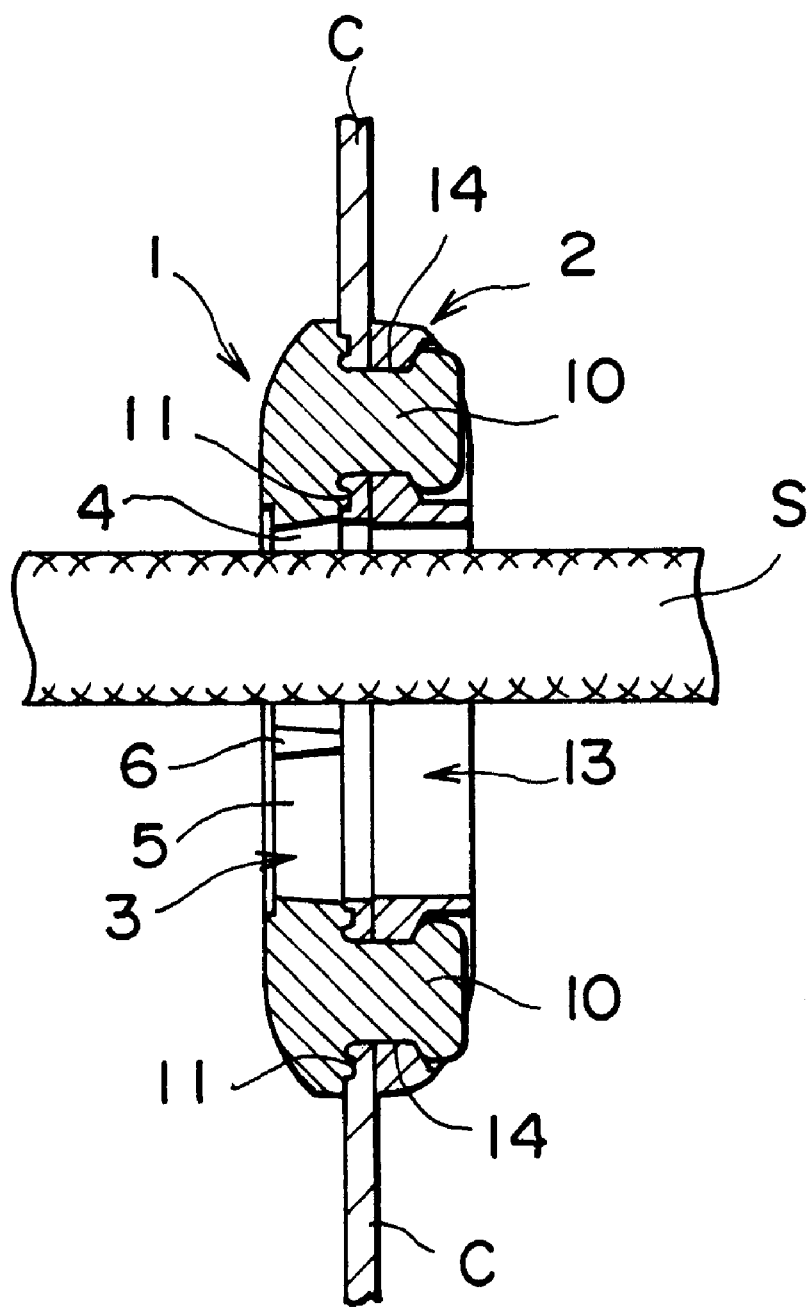
FIG. 9 is a sectional view taken along the line IX–IX of the string fastening device of FIG. 8.
Figure 15:
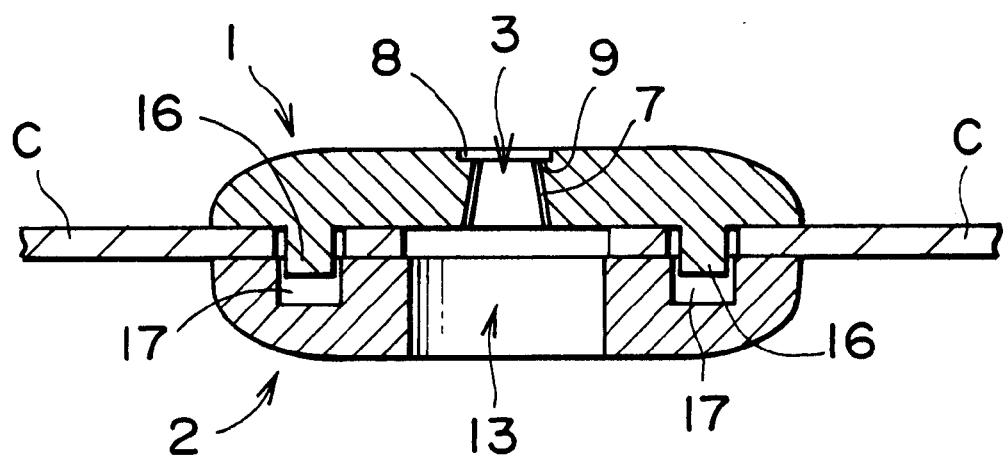
FIG. 15 is a cross sectional view showing a state in which the main body and the fastening body are assembled, of the string fastening device according to the second embodiment.
Figure 18:
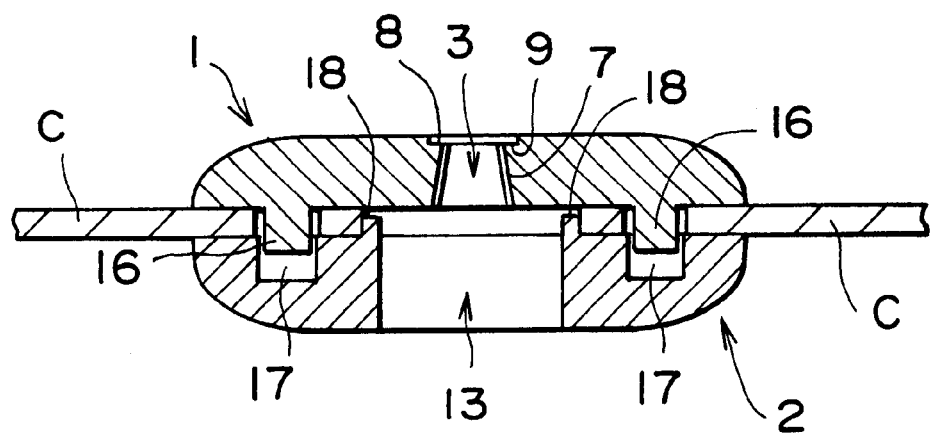
FIG. 18 is a lateral sectional view showing a state in which the main body and fastening body are assembled, of the string fastening device according to the third embodiment.
Figure 20:
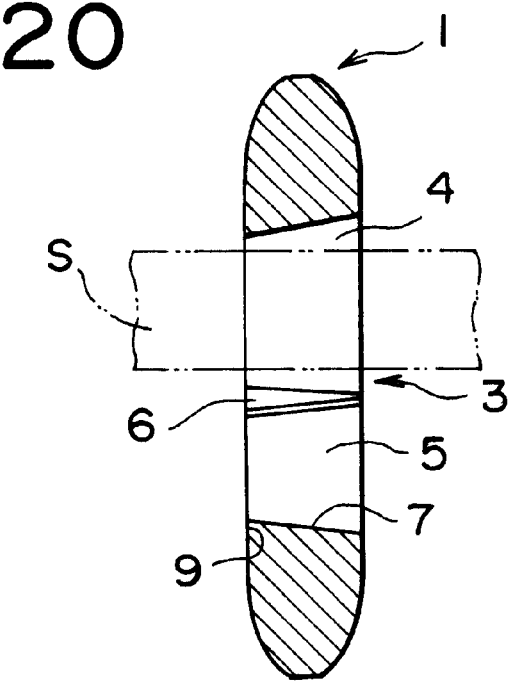
FIG. 20 is a sectional view taken along the line XX–XX of the main body of the string fastening device of FIG. 19.
Figure 22:
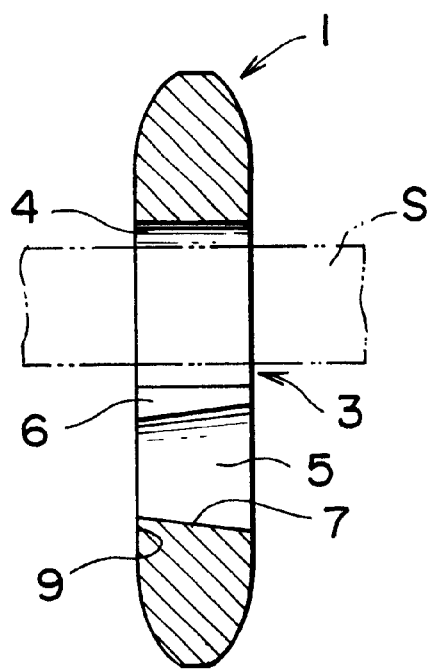
FIG. 22 is a sectional view taken along the line XXII–XXII of the main body of the string fastening device of FIG. 21.

The string fastening device of the present invention includes a type in which a main body 1 and a fastening body 2 are assembled as shown in FIGS. 9, 15 and 18 and a type in which it is formed of a single main body 1 as shown in FIGS. 20 and 22. In either types, the main body 1 and the fastening body 2 are formed by injection molding or extrusion using thermoplastic resin such as polyamide, polyacetal, polyprophylene or polybutylene telephalate or adding abrasion-resistant reinforcement material to these resins, such that the main body 1 and the fastening body 2 are formed integrally respectively.

Figure 1:
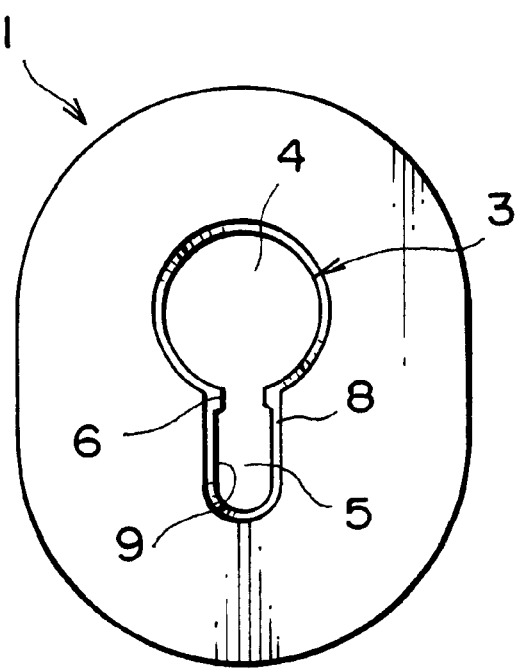
FIG. 1 is a front view of a main body of a string fastening device according to a first embodiment of the present invention.

In the string fastening device of the first embodiment shown in FIG. 9, the main body 1 is formed in an oval shape as shown in FIG. 1 and has a penetrating hole 3 which a string S can pass through in its front face. This penetrating hole 3 is substantially circular in a plan view and a sliding passage portion 4 wider than a diameter of the string S is formed in this penetrating hole 3 so that the string S is capable of moving freely back and forth. A braking passage portion 5 which is smaller than the diameter of the sliding passage portion 4 and oval in a plan view is formed so that it adjoins the sliding passage portion 4. Because the braking passage portion 5 is smaller than the diameter of the string S, it can prevent the string S from moving back and forth. A narrow portion 6 is formed at a joint portion between the sliding passage portion 4 and the braking passage portion 5 such that it is smaller than the width of the braking passage portion 5. This narrow portion 6 prevents the string S threaded through the sliding passage portion 4 or the braking passage portion 5 from changing its position freely.

An inner face of the penetrating hole 3 in each of the sliding passage portion 4 and the braking passage portion 5 is formed to a tapered face 7 which narrows toward a front side of the main body 1. A concave stepped portion 8, which is wider and shallower than the penetrating hole 3, that is, the sliding passage portion 4 and the braking passage portion 5, is formed at an end of this tapered face 7. The tapered face 7 adjoining the stepped portion 8 is formed in an acute angle in its section so as to provide an engaging portion 9. This engaging portion 9 prevents the string S from moving backward, for example, the string S threaded through the braking passage portion 5 from moving inward of the penetrating hole 3. The string S is gripped and captured by the engaging portion 9. Thus, the tapered face 7 of the penetrating hole 3 needs to be formed at least on the peripheral face of the braking passage portion 5. Although the tapered face 7 does not have to be formed on the peripheral face of the sliding passage portion 4, formation of the tapered face 7 on the sliding passage portion 4 can be decided freely.

Figure 2:
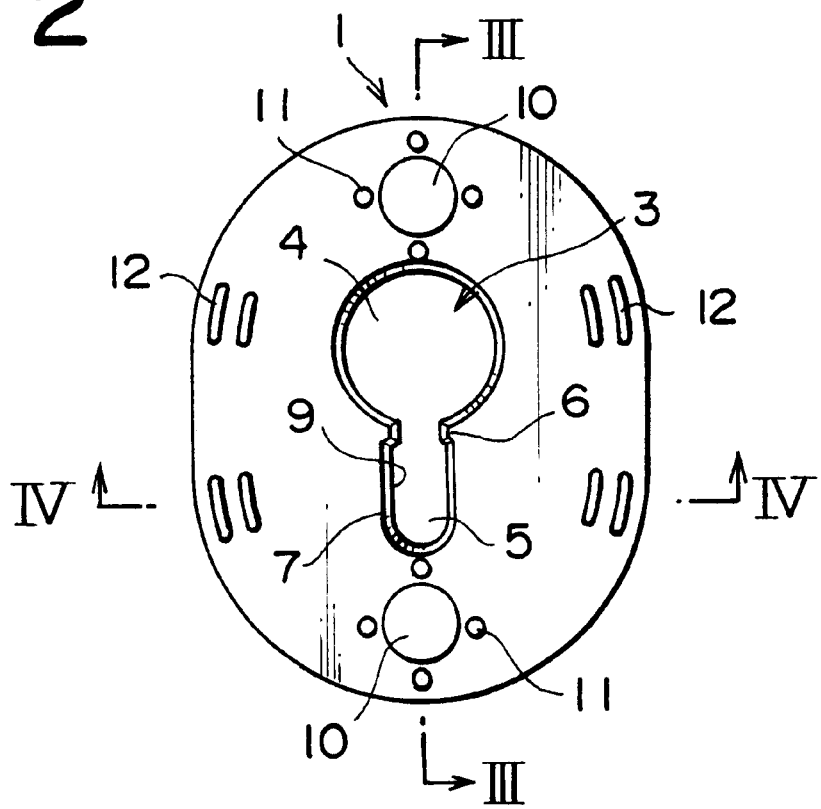
FIG. 2 is a rear view of the main body of the same string fastening device.
Figure 3:
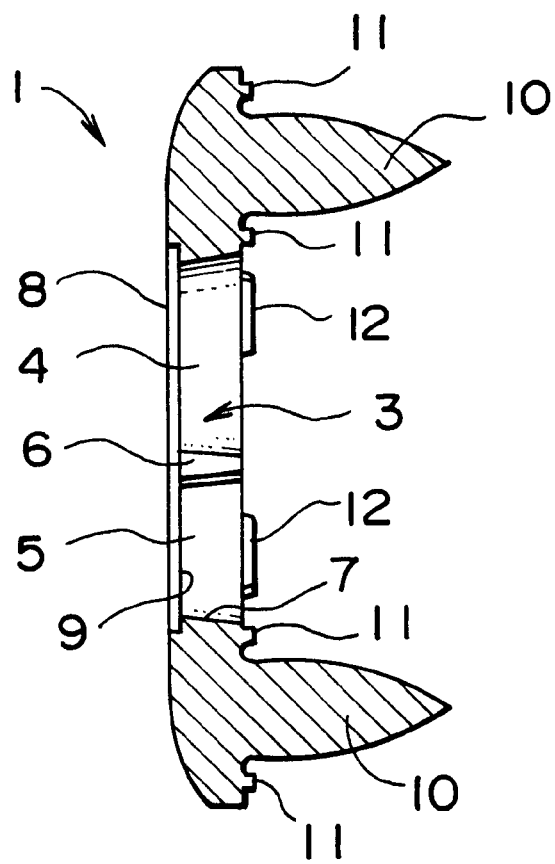
FIG. 3 is a sectional view taken along the line III–III of the main body of the string fastening device of FIG. 2.
Figure 4:
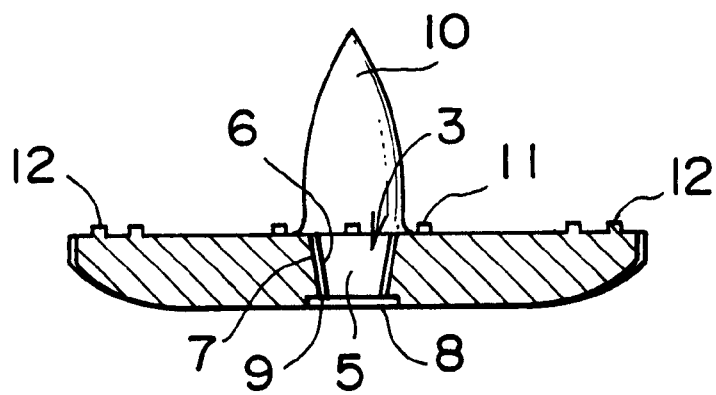
FIG. 4 is a sectional view taken along the line IV–IV of the main body of the string fastening device of FIG. 2.

As shown in FIGS. 2 to 4, attaching posts 10 each having a pointed tip are provided on a rear face of the main body 1 such that they are located outside in the longitudinal direction of the penetrating hole 3, that is, the sliding passage portion 4 and the braking passage portion 5, thereby facilitating attachment of the fastening body 2 to be assembled with the main body 1. Plural small protrusions 11 are provided around a base portion of this attaching post 10 and several small coupling protrusions 12 are provided at plural positions on each of both sides of the penetrating hole 3. Provision of the small protrusions 11 and the coupling protrusions 12 prevents a cloth C nipped between the main body 1 and the fastening body 2 from shifting so as to attach the fastener firmly on the cloth C.

Figure 5:
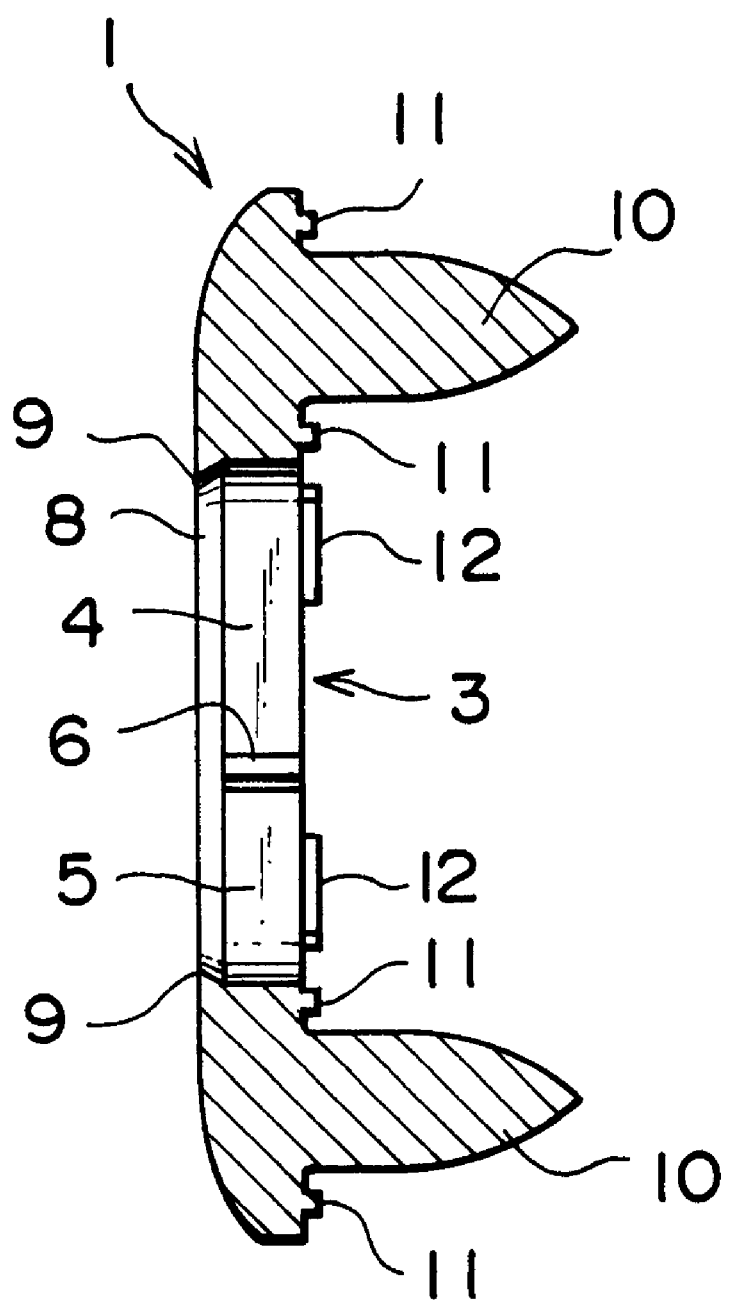
FIG. 5 is a sectional view showing a modification of the main body of the same string fastening device.

The main body 1 of the string fastening device shown in FIG. 5 is a modification of the main body 1 of FIG. 3 and has the substantially same structure as the foregoing example. However, this structure is different from the foregoing in that the tapered face 7 is not provided in the peripheral face of the penetrating hole 3 and the peripheral face portion, that is peripheral faces of the sliding passage portion 4 and the braking passage portion 5 are formed to be vertical and that the engaging portion 9 having an acute angle is provided to protrude inwardly from an outside edge of the sliding passage portion 4 and the braking passage portion 5 in the form of the vertical surfaces. This engaging portion 9 enables to restrict movement of the string S by gripping and capturing the string S threaded through the braking passage portion 5.

Figure 6:
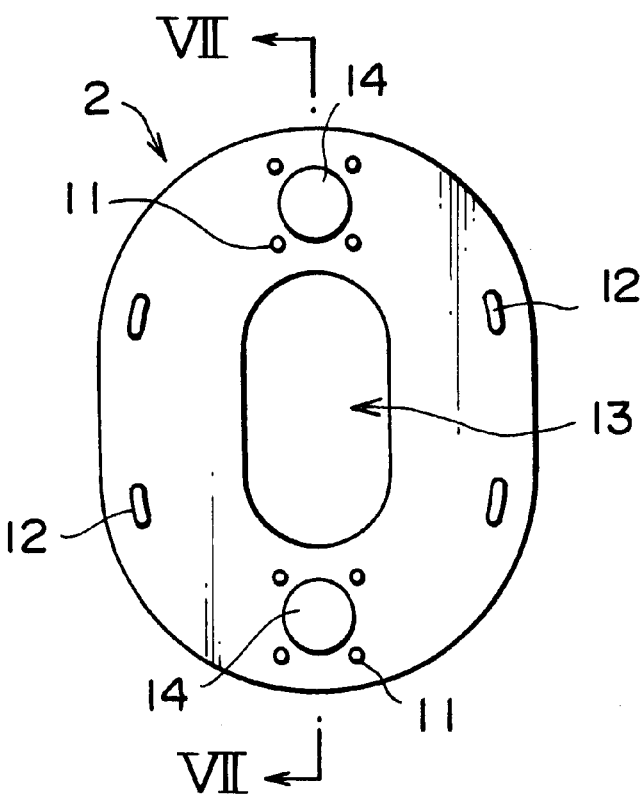
FIG. 6 is a rear view of a fastening body of the string fastening device according to the first embodiment.
Figure 7:
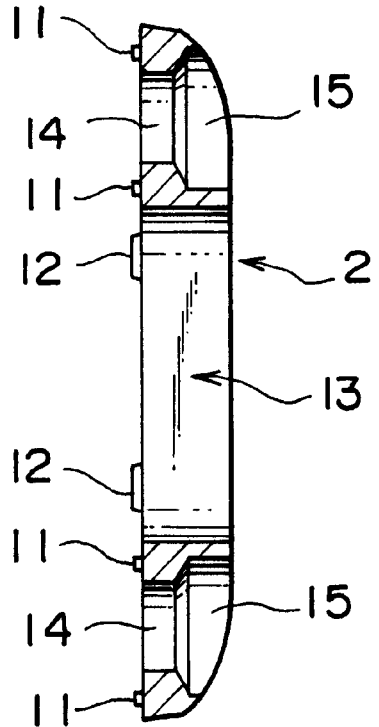
FIG. 7 is a sectional view taken along the line VII–VII of the fastening body of the string fastening device of FIG. 6.

As shown in FIGS. 6 and 7, the fastening body 2 is oval and a through hole 13 having the same diameter as that of the sliding passage portion 4 is formed in the longitudinal direction of the oval shape in the center of a surface. Circular attaching holes 14 are provided outside of this through hole 13 in the longitudinal direction at such positions that they oppose the attaching posts 10, so that the attaching posts 10 can be inserted into the attaching holes 14. A recess 15 is formed around each attaching hole 14 in the front face of the fastening body 2 such that the tip of the attaching post 10 can be crushed and fixed therein. The arrangement of the attaching post 10 and the attaching hole 14 is not restricted to the above described embodiment, but the attaching post 10 may be provided on the fastening body 2 and the attaching hole 14 may be provided in the main body 1.

Plural small protrusions 11 are provided around the attaching hole 14 in the rear face of the fastening body 2 such that they stagger from the small protrusions 11 of the main body 1. Further, coupling protrusions 12 are provided at positions that they oppose the small coupling protrusions 12 provided in the main body 1 on both sides of the through hole 13 such that they stagger from the small coupling protrusions 12 of the main body 1. Consequently, the cloth C is nipped firmly by the small protrusions 11 and the coupling protrusions 12 so as to fix the string fastening device.

Figure 8:
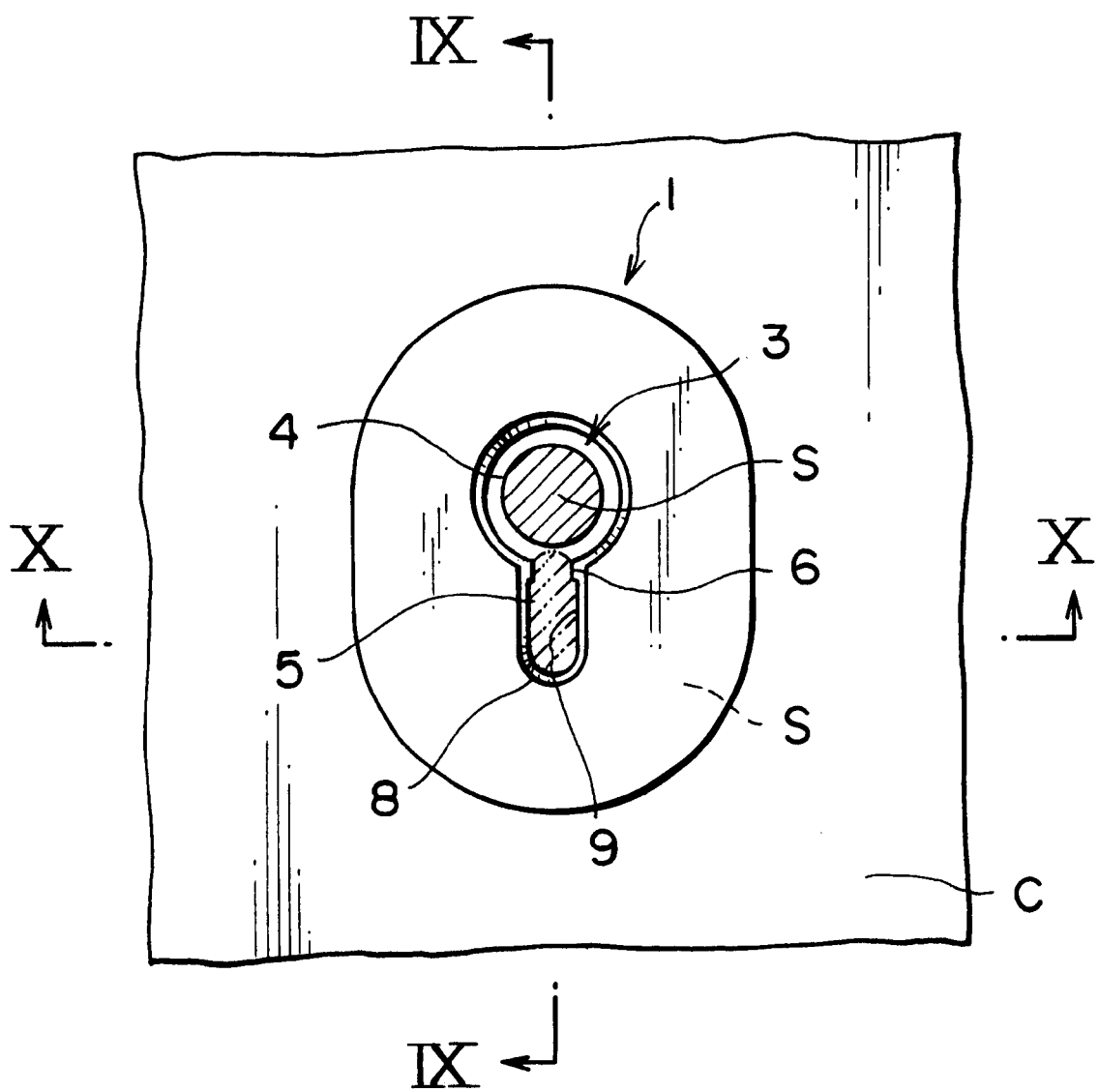
FIG. 8 is a front view of the string fastening device showing a state in which the string is passed through the string fastening device of the first embodiment.
Figure 10:
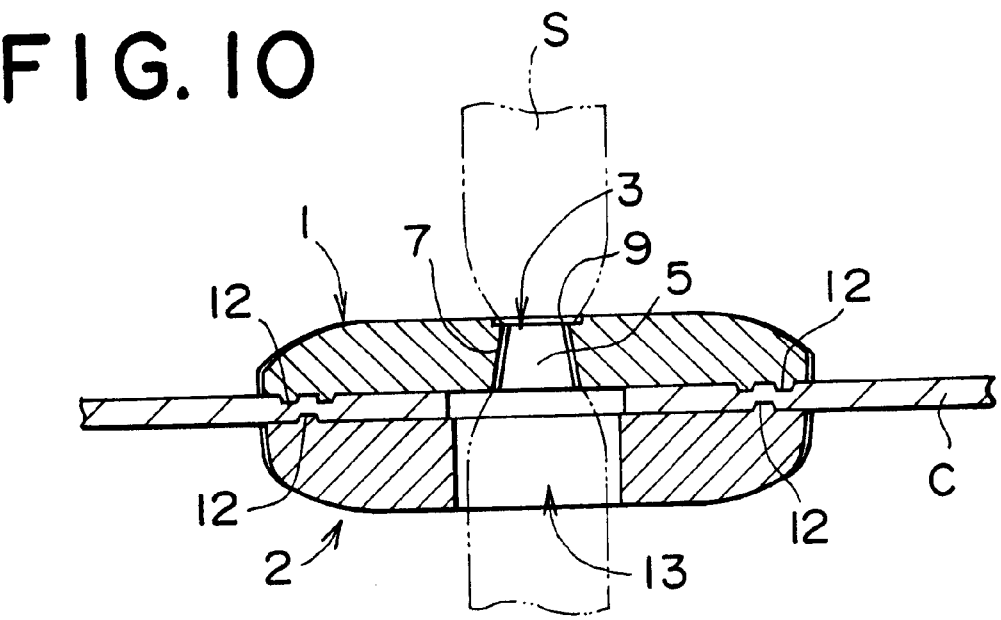
FIG. 10 is a sectional view taken along the line X–X of the string fastening device of FIG. 8.
Figure 11:
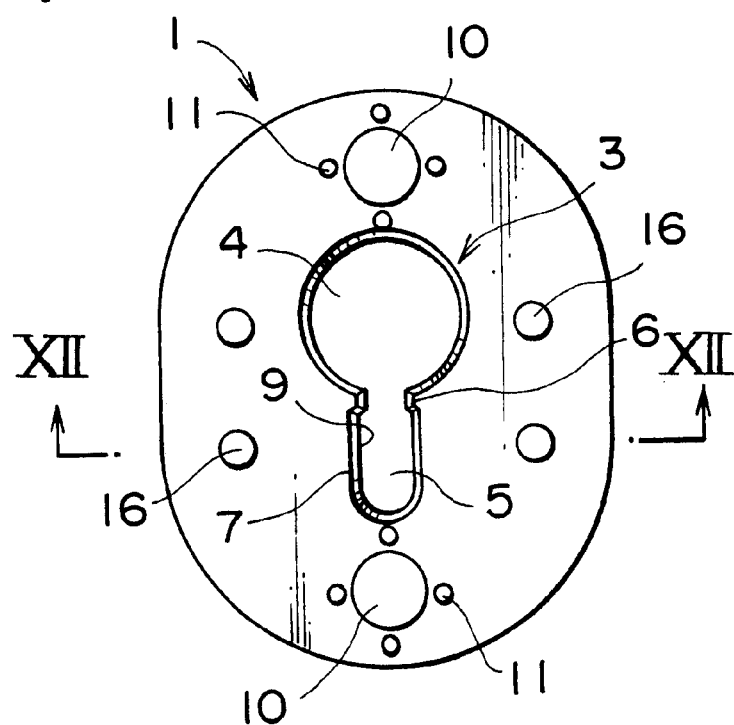
FIG. 11 is a rear view of the main body of the string fastening device according to a second embodiment of the present invention.
Figure 12:
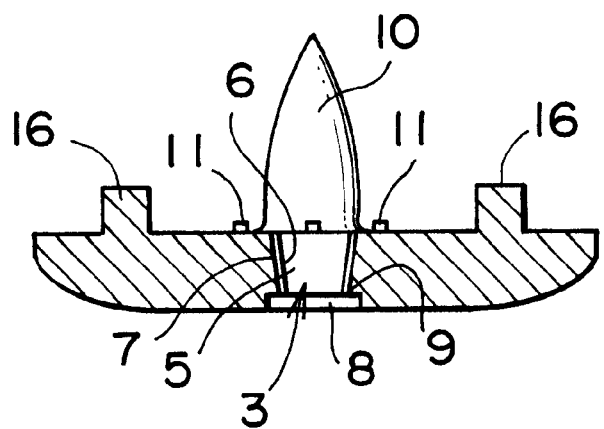
FIG. 12 is a sectional view taken along the line XII–XII of the main body of the string fastening device of FIG. 11.
Figure 13:
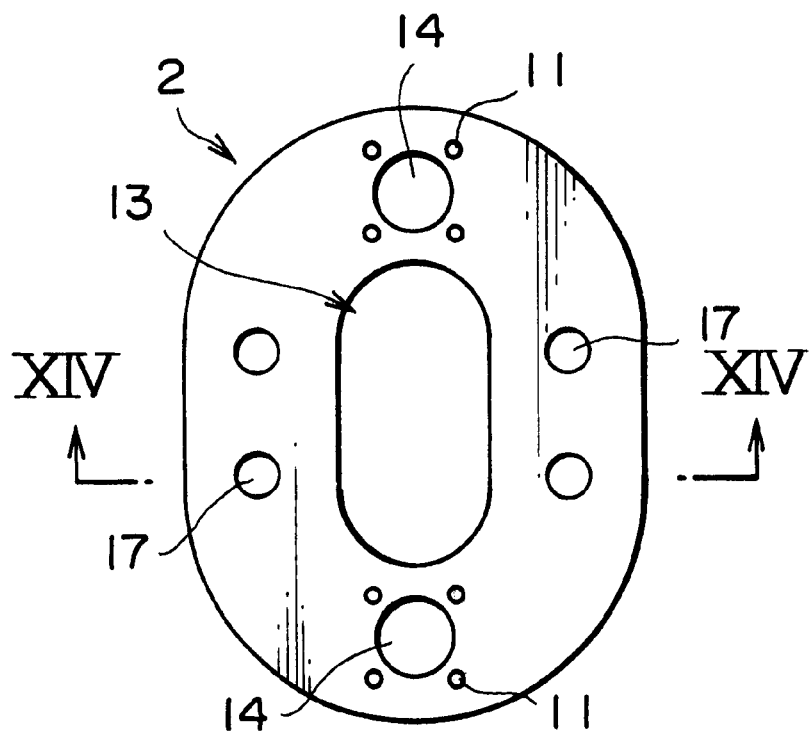
FIG. 13 is a rear view of the fastening body of the same string fastening device.
Figure 14:
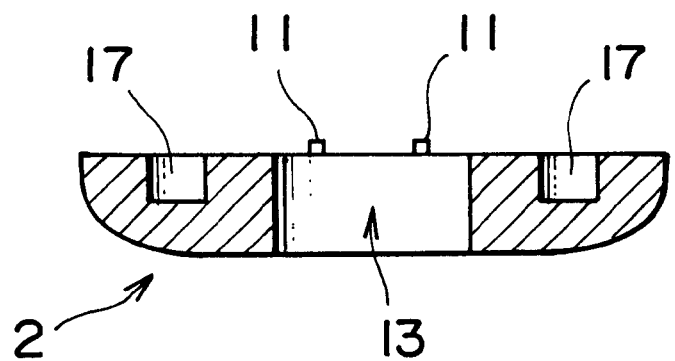
FIG. 14 is a sectional view taken along the line XIV–XIV of the fastening body of the string fastening device of FIG. 13.

As for use condition of the string fastening device comprised of the main body 1 and the fastening body 2, as shown in FIGS. 8 to 10, the cloth C having a string threading hole H substantially coinciding with the through hole 13 is nipped between the main body 1 and the fastening body 2. The attaching posts 10 of the main body 1 are pierced through the cloth C and then inserted into the attaching holes 14 in the fastening body 2. Then, the tips of the attaching posts 10 are crushed by pressing with heat or cooling and fixed in the recesses 15. At that time, the cloth C is held firmly by the staggered small protrusions 11 and also by the staggered coupling protrusions 12, so that the cloth C is never slid.

In the string fastening device attached on the cloth C, the string S attached to clothes is threaded into the sliding passage portion 4 of the penetrating hole 3. After the tightening operation is done, the string S is transferred from the sliding passage portion 4 to the narrow portion 6 such that it is compressed. When the string S is moved to the braking passage portion 5 with a state indicated by two dot and dash line, the string S is held and captured by the engaging portion 9 of the braking passage portion 5, so that it is not capable of moving back or forth. Thus, tightening of the string S can be adjusted easily. If it is intended to loosen the tightening of the string S, the string S is moved from the braking passage portion 5 to the sliding passage portion 4, so that the string S can be loosened easily.

A string fastening device according to a second embodiment of the present invention shown in FIGS. 11 to 15 has the same structure as the first embodiment in the penetrating hole 3 and the attaching posts 10 disposed in the main body 1, the through hole 13 and the attaching holes 14 disposed in the fastening body 2. A different structure is provision of relatively large convex portions 16 at positions corresponding to the coupling protrusions 12 disposed on the rear face of the main body 1 instead of the coupling protrusions 12 and formation of concave portions 17 which the convex portions 16 can engage with in the rear face of the fastening body 2. By engaging the convex portions 16 with the concave portions 17, positioning of the main body 1 and the fastening body 2 is facilitated. The dispositions of the convex portions 16 and the concave portions 17 are not limited to the above described embodiment, but the concave portions 17 may be formed in the main body 1 and the convex portions 16 may be provided on the fastening body 2. Meanwhile, the combination and use condition of the main body 1 and the fastening body 2 are the same as the first embodiment.

Figure 16:
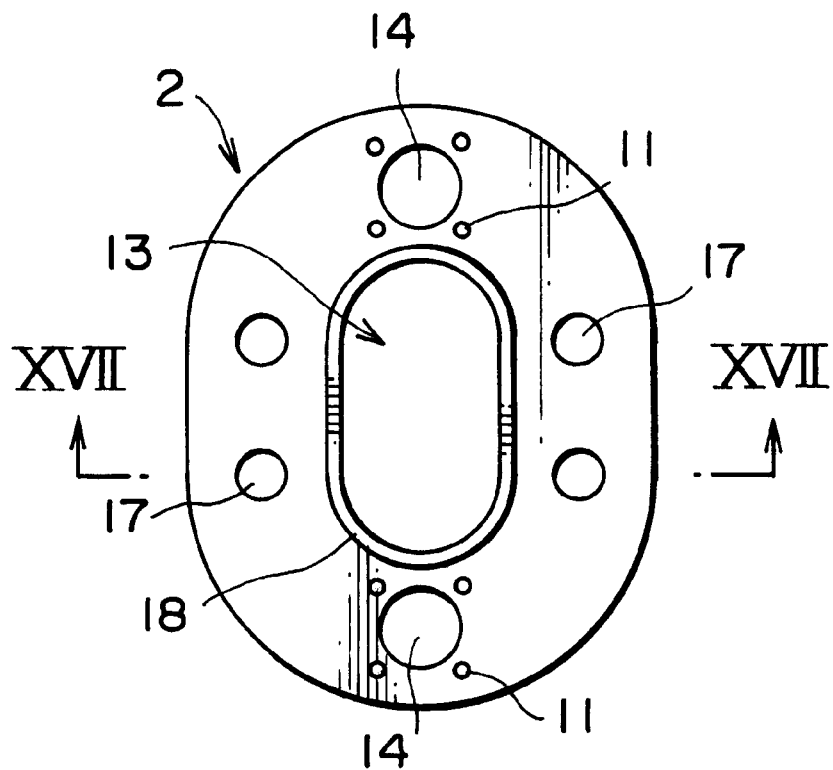
FIG. 16 is a rear view of the fastening body of the string fastening device according to a third embodiment of the present invention.
Figure 17:
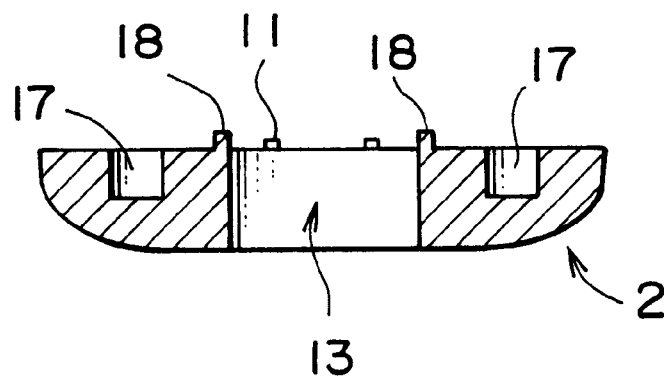
FIG. 17 is a sectional view taken along the line XVII–XVII of the fastening body of the same string fastening device.

A string fastening device according to a third embodiment of the present invention shown in FIGS. 16 to 18 has the same structure as the string fastening device of the second embodiment in the penetrating hole 3 and the attaching posts 10 disposed in the main body 1 and the through hole 13 and the attaching hole 14 disposed in the fastening body 2. A different structure is provision of a protruded row 18 provided along the periphery of the through hole 13 provided in the fastening body 2 such that it is protruded against the main body 1 when the fastening body 2 is assembled with the main body 1. The provision of the protruded row 18 prevents yarns at an end around the string threading hole H provided in the cloth C from coming out into the penetrating hole 3. Meanwhile, the combination and use condition of the main body 1 and the fastening body 2 are the same as the string fastening body of the second embodiment.

The main body 1 and the fastening body 2 of the above described respective embodiments may be used as a single string fastening device in a state that they are combined with each other before the string S is threaded into them, without attaching the main body 1 and the fastening body 2 onto the cloth C.

Figure 19:
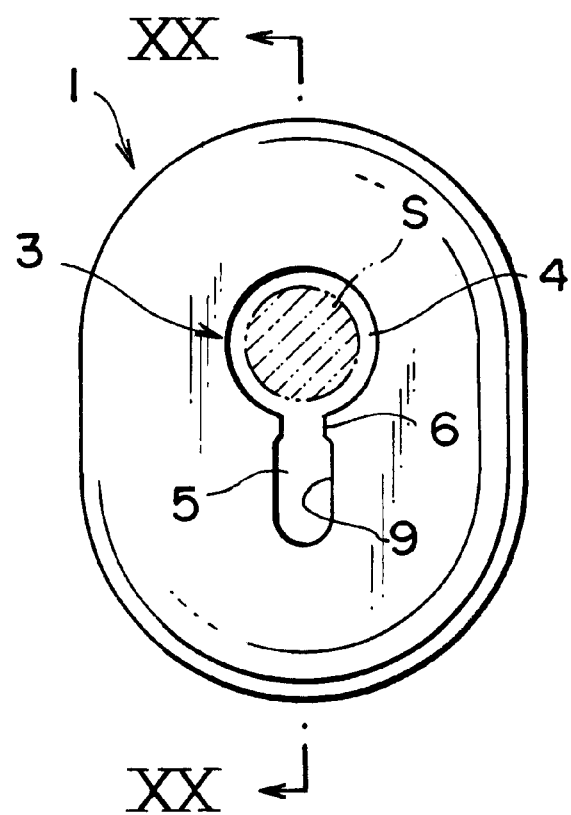
FIG. 19 is a front view of the main body of the string fastening device according to a fourth embodiment of the present invention.

Although the string fastening device of the above described respective embodiments is comprised of the main body 1 and the fastening body 2, a string fastening device of a fourth embodiment of the present invention shown in FIGS. 19 and 20 is comprised of only the main body 1 and therefore used with only the main body 1. The main body 1 is oval and has the penetrating hole 3 in the longitudinal direction in the center thereof. This penetrating hole 3 is comprised of the sliding passage portion 4 which is circular and allows the string S to be moved back or forth freely and the braking passage portion 5 which is smaller in diameter than the sliding passage portion 4 and oval in a plan view so as to restrict forward/backward movement of the string S is formed so that it adjoins the sliding passage portion 4. The narrow portion 6 having a smaller width than the braking passage portion 5 is formed a joint portion between the sliding passage portion 4 and the braking passage portion 5 so as to prevent the string S from changing its path freely.

An inner face of the penetrating hole 3 is formed in the tapered face 7 in which a diameter/width of the hole decreases gradually toward one side of the main body 1, in the sliding passage portion 4, the braking passage portion 5 and the narrow portion 6. An engaging portion 9 having an acute angled section is formed at an edge of the tapered face 7. Particularly the threaded string S is gripped and captured by the engaging portion 9 formed on the braking passage portion 5 from being moved. As for the use condition of the string fastening device, an end of the string S passing through clothes is inserted into the sliding passage portion 4 such that the side in which the tapered face 7 of the main body 1 is narrower is disposed outside. After that, the string S is moved to the braking passage portion 5 and then, the main body 1 is moved in a direction to tighten the string S. Then, the string fastening device is fastened to the string S and the tightening of the string is adjusted if necessary. If it is intended to loosen the tightening, the string S is moved to the sliding passage portion 4. Then, the tightening can be loosened easily.

Figure 21:
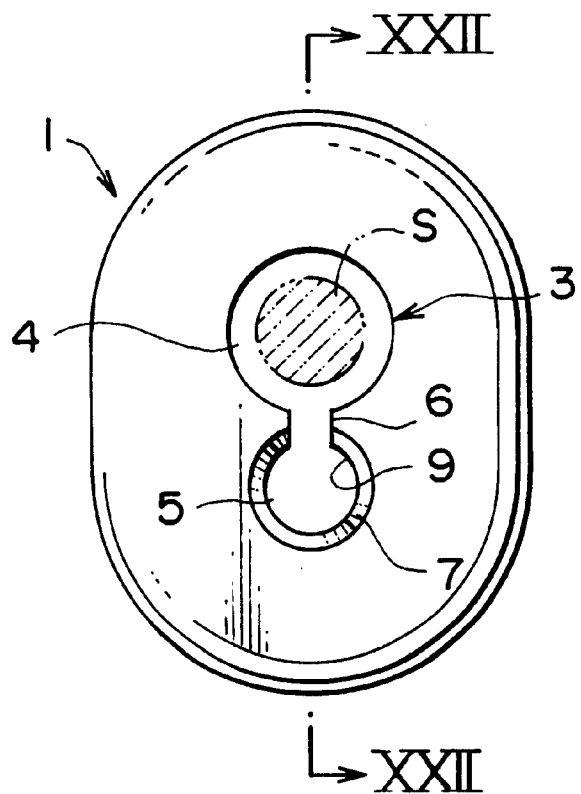
FIG. 21 is a front view of the main body of the string fastening device according to a fifth embodiment of the present invention.

Although the string fastening device of a fifth embodiment of the present invention shown in FIGS. 21 and 22 has substantially the same structure as the string fastening device of the fourth embodiment, a different structure thereof is that the braking passage portion 5 is of a circle in its plan view having a smaller diameter than that of the sliding passage portion 4 and the tapered face 7 is provided on a peripheral face. No tapered face 7 is provided on the sliding passage portion 4 and the narrow portion 6 of the penetrating hole 3 unlike the braking passage portion 5. Therefore, the string S suitable for the string fastening device of this type is a round string. The use condition of this string fastening device is the same as the fourth embodiment.

Figure 23:
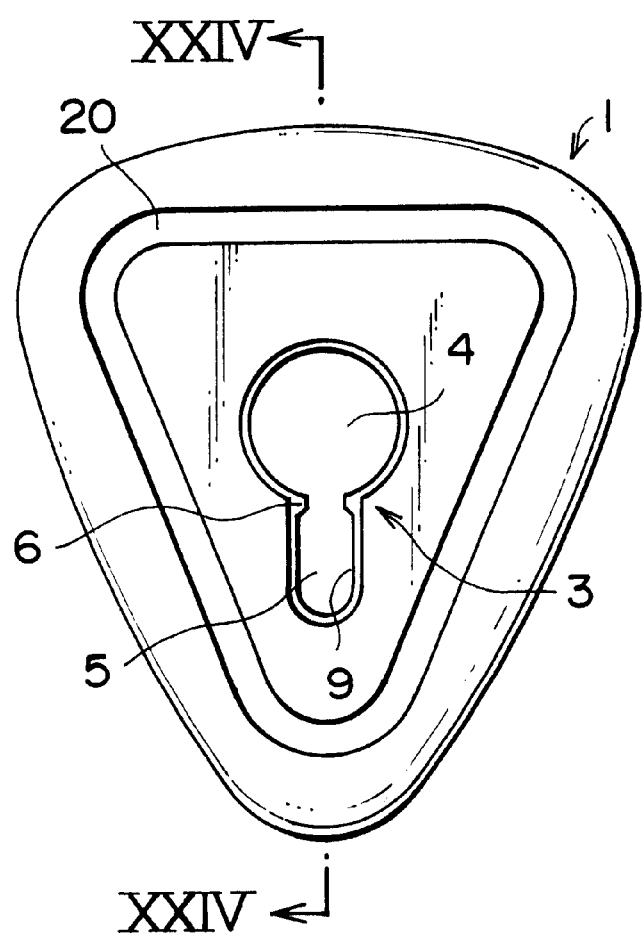
FIG. 23 is a front view of the main body of the string fastening device according to a sixth embodiment.
Figure 24:
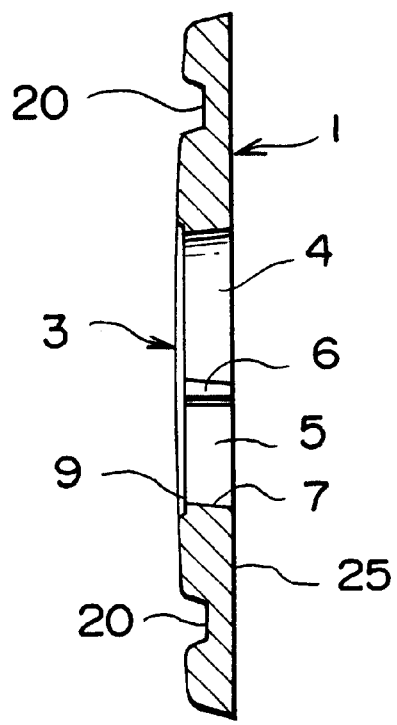
FIG. 24 is a cross sectional view taken along the line XXIV–XXIV of the main body of the string fastening device of FIG. 23.
Figure 25:
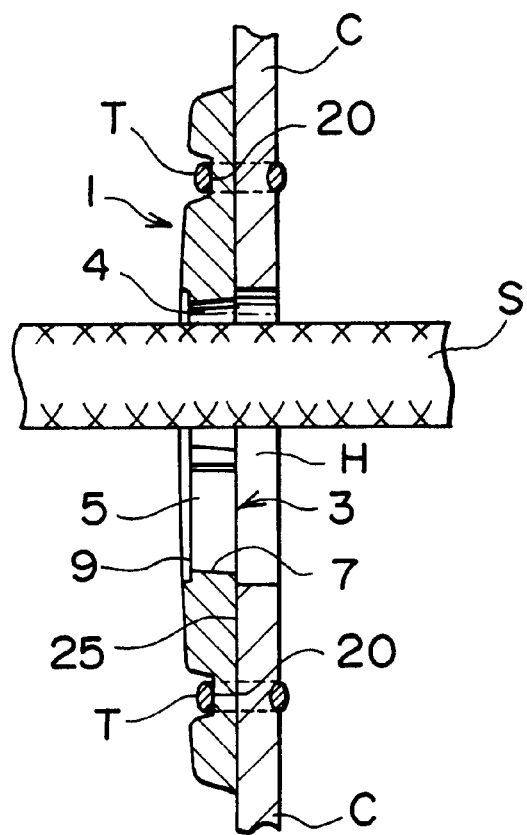
FIG. 25 is a cross sectional view showing the main body of the same string fastening device in use.

A string fastening device according to a sixth embodiment of the invention shown in FIGS. 23 to 25 can be used solely with the main body 1 of the device. The main body 1 is in a form of a generally triangular flat plate which has the penetrating hole 3 in its center through which the string S is threaded, to define the sliding passage portion 4 which is circular and allows the string S to be moved back or forth freely. The braking passage portion 5 is provided from the sliding passage portion 4 toward an end of the main body 1 which is smaller in diameter than the sliding passage portion 4 so as to restrict the movement of the string S. A narrow portion 6 is formed in an boundary between the sliding passage portion 4 and braking passage portion 5 so as to prevent the string S from changing its path freely. A rear surface of the main body 1 is formed to be a flat face 25 to be attached to the cloth C of the article in a stable manner by sewing.

An inner face of the penetrating hole 3 is formed in the tapered face 7 in which a diameter/width of the hole decreases gradually toward one side of the main body 1, in the sliding passage portion 4, the braking passage portion 5 and the narrow portion 6. An engaging portion 9 having an acute angled section is formed at an edge of the tapered face 7. Particularly the threaded string S is gripped and captured by the engaging portion 9 formed on the braking passage portion 5 from being moved. As for the use condition of the string fastening device, an end of the string S passing through clothes is inserted into the sliding passage portion 4 such that the side in which the tapered face 7 of the main body 1 is narrower is disposed outside. After that, the string S is moved to the braking passage portion 5 and then, the main body 1 is moved in a direction to tighten the string S. Then, the string fastening device is fastened to the string S and the tightening of the string is adjusted if necessary. If it is intended to loosen the tightening, the string S is moved to the sliding passage portion 4. Then, the tightening can be loosened easily.

A triangular attachment groove 20 of recessed cross section for guiding a sewing thread T is provided outside and around the sliding passage portion 4 and braking passage portion 5 on the surface of the main body 1. The attachment groove 20 should be linearly provided, so as to facilitate machine sewing and serves to prevent the sewing thread T from contacting with other article and getting worn.

As shown in FIG. 25, the main body 1 is placed on the cloth C around the string threading hole H for insertion of the string which is previously made in the cloth C, with the flat face 25 of the main body 1 being in contact with the cloth C. Then the main body 1 is attached by machine sewing with the thread T along the attachment groove 20 formed in the recess shape on the surface of the main body 1.

The foregoing main body 1 of the string fastening device can be formed of the thermoplastic resin which is the same as the material of the main body 1 of the first embodiment.

Moreover, the main body 1 can be injection molded using thermoplastic elastomer such as urethane elastomer or polyester elastomer as its material so as to provide elasticity to the main body 1 to softly fasten the string S to restrict it from moving back and forth.

Figure 26:
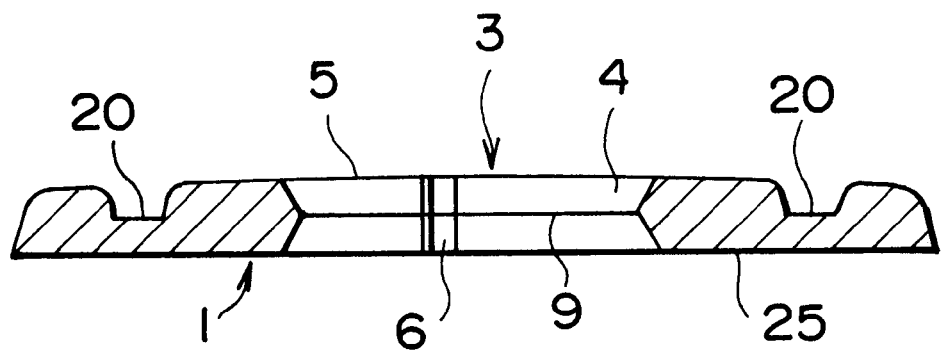
FIG. 26 is a cross sectional view showing a first modification of the main body of the same string fastening device.

The main body 1 of the string fastening device shown in FIG. 26 is a modification of the main body 1 of FIG. 24. The structure of the main body 1 is substantially the same. The main body 1 of the modification is different in that no tapered face 7 is formed in the peripheral face of the penetrating hole 3 and that a mountain shaped engaging portion 9 is provided to protrude inwardly from the center of the peripheral faces of the sliding passage portion 4 and the braking passage portion 5. The main body 1 is formed using the thermoplastic elastomer as its material and the engaging portion 9 serves to grip and capture the string S threaded through the braking passage portion 5 to restrict movement of the string S.

Figure 27:
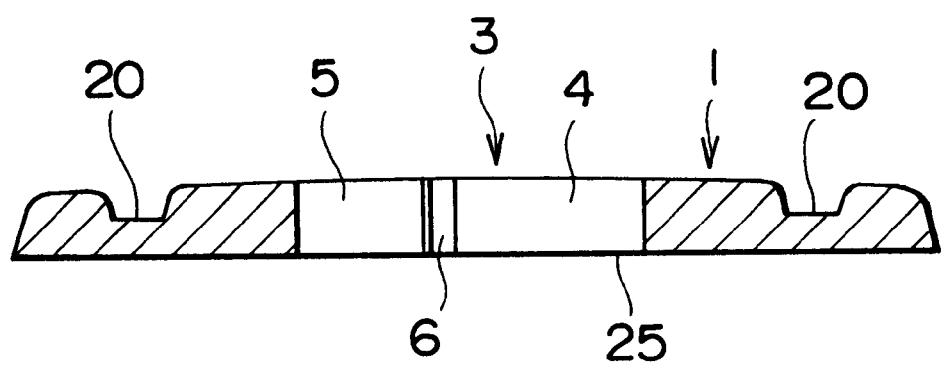
FIG. 27 is a cross sectional view showing a second modification of the main body of the same string fastening device.

Further, the main body 1 of the string fastening device shown in FIG. 27 is a modification of the main body of FIG. 24. The structure of the main body 1 of FIG. 27 is substantially identical with the main body 1 of FIG. 24 but is different in that no tapered face 7 nor engaging portion 9 is provided in the peripheral faces of the sliding passage portion 4 and braking passage portion 5. By forming the main body 1 using the termoplastic elastomer, the entire main body 1 becomes elastic, which means that the braking passage portion 5 necessarily has elasticity so that the string S threaded through the braking passage portion 5 can be gripped and captured softly to restrict the movement of the string S. In case of using the main body 1 with elasticity, the string S is effectively prevented from being damaged.

Figure 28:
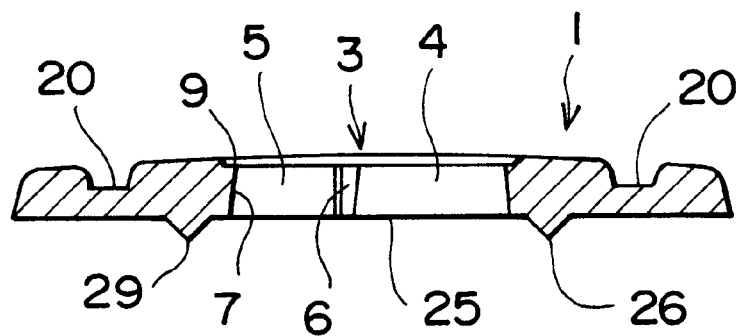
FIG. 28 is a front view showing a third modification of the main body of the same string fastening device.

The string fastening device shown in FIG. 28 is a modification of the main body. The main body 1 of the modification is different in that plural protruding portions 26 are provided in the periphery of the sliding passage portion 4 and braking passage portion 5 on the flat face 25, so as to protrude outside to bite into the cloth C to prevent movement of the cloth C at the time of sewing the main body 1 to the cloth C.

Figure 29:
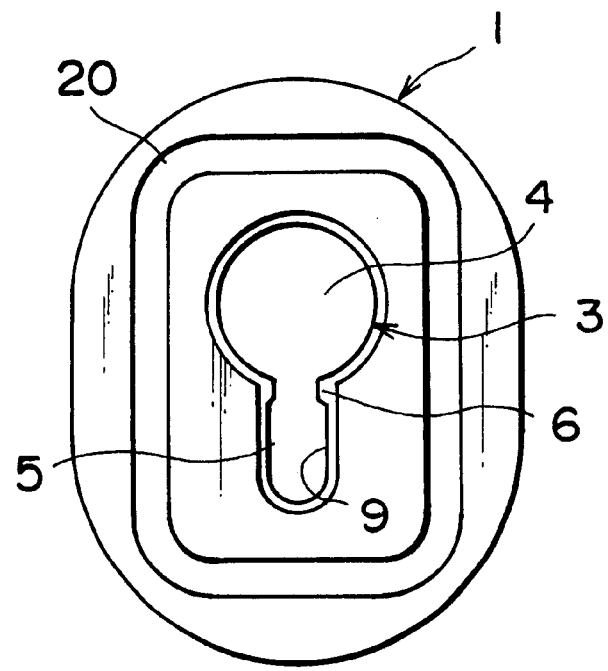
FIG. 29 is a front view showing a fourth modification of the main body of the same string fastening device.
Figure 30:
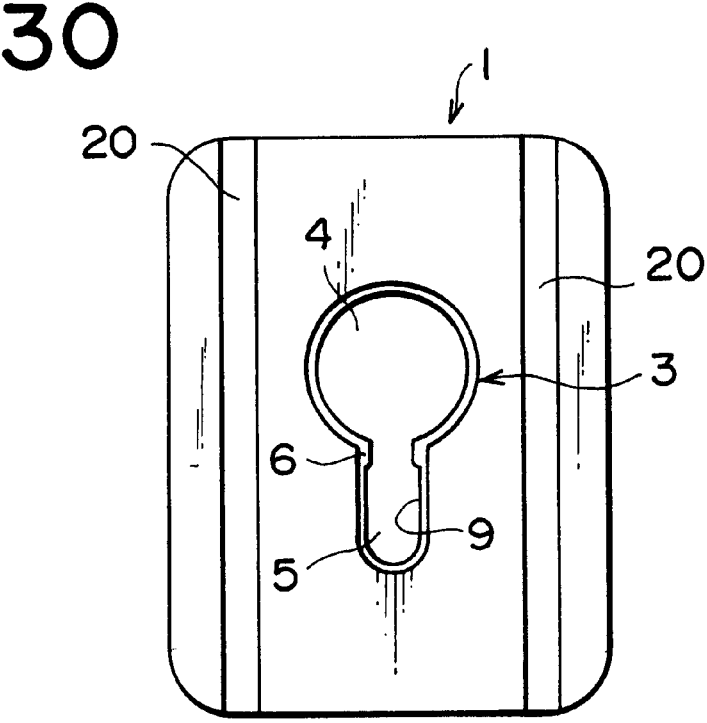
FIG. 30 is a front view showing a fifth modification of the main body of the same string fastening device.
Figure 31:
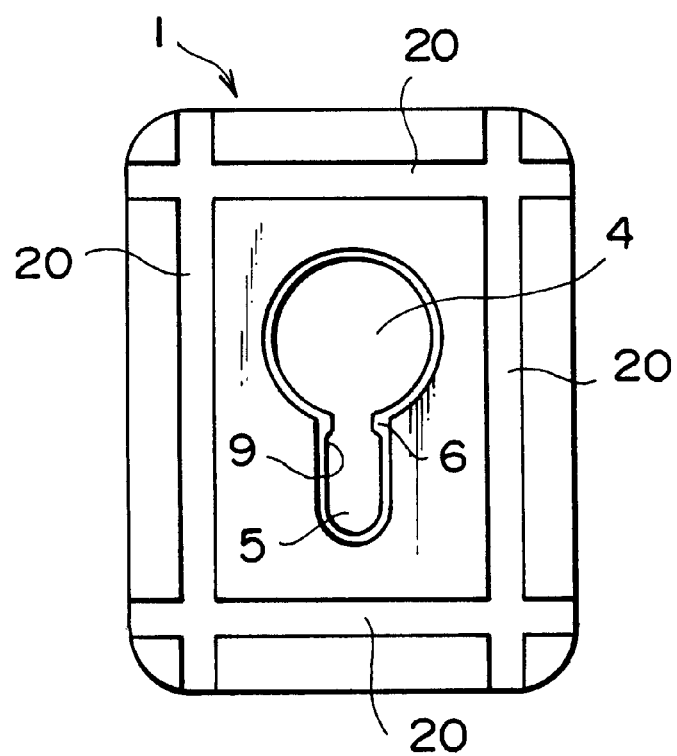
FIG. 31 is a front view showing a sixth modification of the main body of the same string fastening device.

FIGS. 29 to 31 show modifications of the attachment groove 20 for the sewing thread T provided in the main body 1. In FIG. 29, the penetrating hole 3 is formed substantially in the center of the main body 1 of flat oval shape generally, to define the sliding passage portion 4, the braking passage portion 5 and the narrow portion 6. The attachment groove 20 having recess shape section for machine sewing is formed around and outside of the sliding passage portion 4 and braking passage portion 5 on the surface of the main body 1. The attachment groove 20 should be linearly provided, so as to facilitate the machine sewing.

In FIG. 30, the flat rectangular main body 1 has the penetrating hole 3 substantially in its center to define the sliding passage portion 4, the braking passage portion 5 and the narrow portion 6. The attachment grooves 20 having recess shape section for machine sewing are formed on both outer sides of the sliding passage portion 4 and braking passage portion 5. These attachment grooves 20 is in the linear shape so as to facilitate the machine sewing.

In the main body 1 of FIG. 31, the penetrating hole 3 is formed substantially in the center thereof to define the sliding passage portion 4, the braking passage portion 5 and the narrow portion 6. The attachment grooves 20 having recess shape section are provided in a grid-like pattern on outside surface around the sliding passage portion 4 and the braking passage portion 5 on the front face of the main body 1. The attachment grooves 20 in the main body 1 are linear so that machine sewing can be done conveniently.

Figure 32:
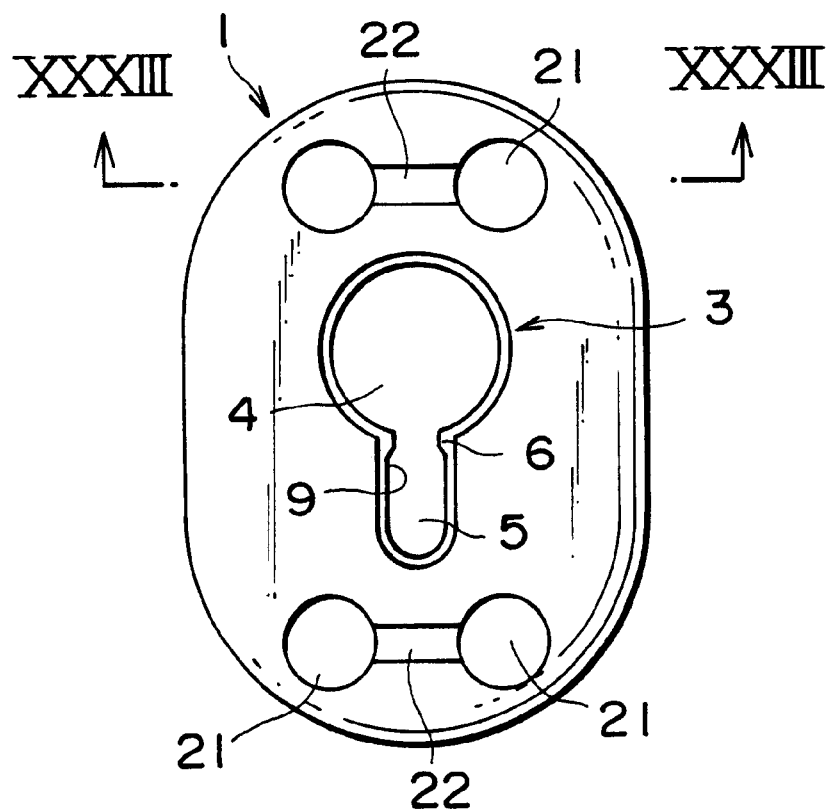
FIG. 32 is a front view showing a seventh modification of the main body of the same string fastening device.
Figure 33:
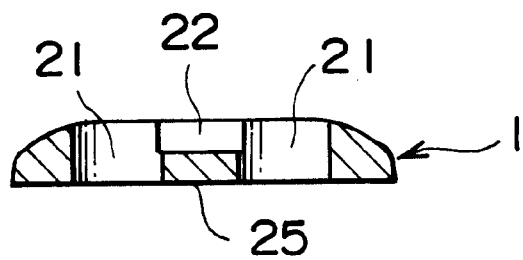
FIG. 33 is a cross sectional view taken along the line XXXIII–XXXIII of the main body of the string fastening device of FIG. 32.

The string fastening device shown in FIGS. 32 to 35 is a modification including sewing holes 21 and recess grooves 22 for the sewing thread T in the main body 1. In FIGS. 32 and 33, the penetrating hole 3 is formed substantially in the center of the plate-like flat oval main body 1 to define the sliding passage portion 4, the braking passage portion 5 and the narrow portion 6. A pair of circular sewing holes 21 for inserting the sewing thread T therethrough are formed in the main body 1 at each of longitudinal both end sides of the main body 1. The recess groove 22 is formed to communicate the pair of sewing holes 21. Thus sewing with the sewing thread T would be easy and the main body 1 can be sewn to be attached stably. Moreover, the sewing thread T is received in the recess groove 22 so that it can be prevented from wearing due to contact with other articles.

Figure 34:
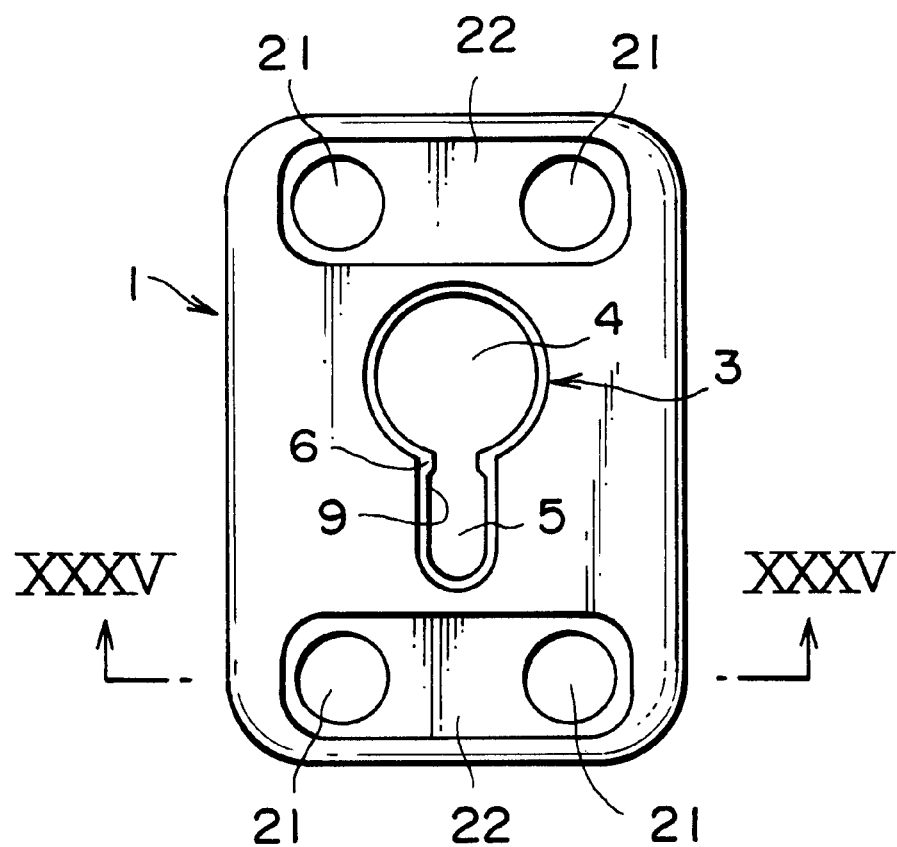
FIG. 34 is a front view showing an eighth modification of the main body of the same string fastening device.
Figure 35:
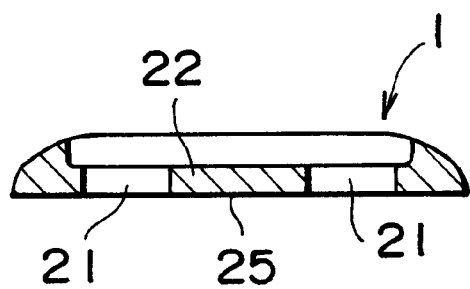
FIG. 35 is a cross sectional view taken along the line XXXV–XXXV of the main body of the string fastening device of FIG. 34.

In FIGS. 34 and 35, the penetrating hole 3 is formed substantially in the center of the flat plate-like main body of general rectangular shape, and a pair of circular sewing holes 21 for threading the sewing thread T are formed at each of the longitudinal both end sides in the rear face of the main body 1. A portion around and including the sewing holes 21 is formed to be the recess groove 22 which is wide and has a recess shape section, so that sewing operation using the sewing thread T can be done easily and in a stable condition. Further, the sewing thread T is received in the recess groove 22 to be protected from other articles so as not to get worn.

Figure 36:
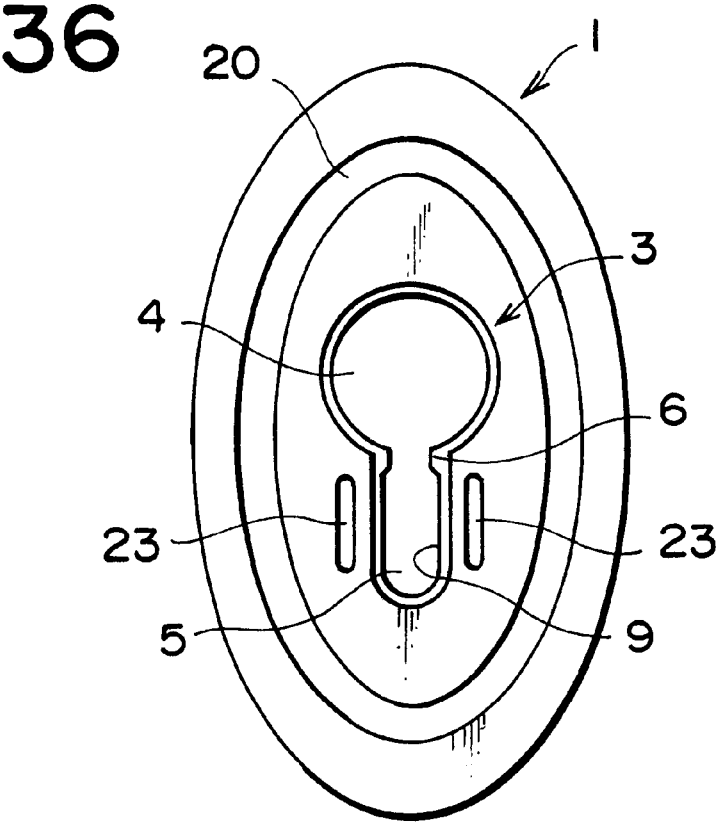
FIG. 36 is a front view showing a ninth modification of the main body of the same string fastening device.
Figure 37:
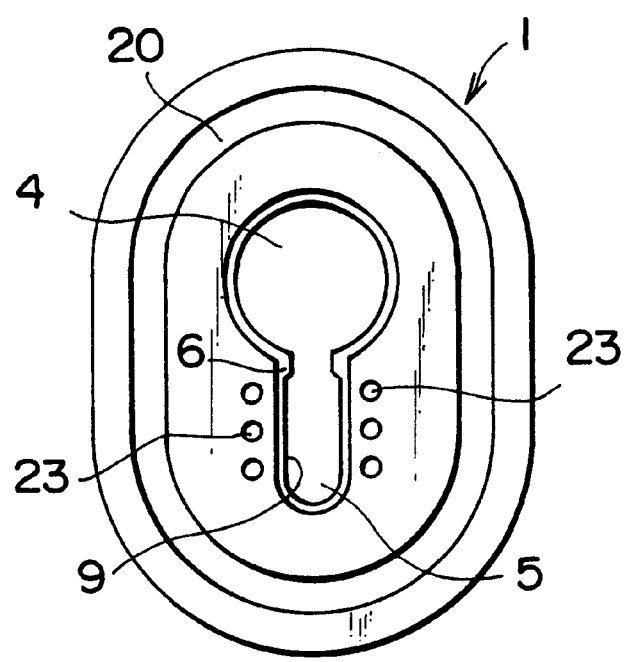
FIG. 37 is a front view showing a tenth modification of the main body of the same string fastening device.

In FIGS. 36 and 37, another modification of the main body 1 is shown in which the braking passage portion 5 provided in the main body 1 can be elastically deformed. FIG. 36 shows the generally flat oval plate-like main body 1 having the penetrating hole 3 substantially in its center to define the sliding passage portion 4, the braking passage portion 5 and narrow portion 6. Long small holes 23 are made along the braking passage portion 5 at both sides thereof to facilitate deformation of the braking passage portion 5, so as to cope with any change of size of the string S used. The attachment groove 20 of recess shape section is formed in the front face of the main body 1 to facilitate sewing by machine along an outer periphery, so that the oval-shaped main body 1 can be attached to the cloth C neatly.

In FIG. 37, the penetrating hole 3 is formed substantially in the center of the flat oval plate-like main body 1 to define the sliding passage portion 4, the braking passage portion 5 and the narrow portion 6. The small holes 23 are formed along the braking passage portion 5 at both sides thereof so as to facilitate deformation of the braking passage portion 5. Thus it can cope with change of the size of the string S used. The attachment groove 20 of recess shape section is formed in the front face of the main body 1 to facilitate sewing by machine along the outer periphery, so that the main body 1 can be attached to the cloth C neatly.

Figure 38:
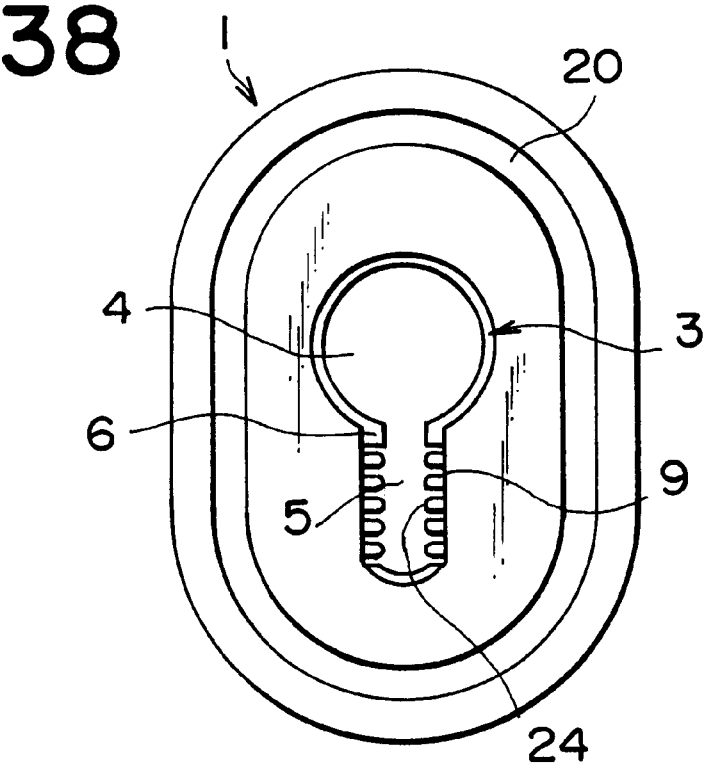
FIG. 38 is a front view showing an eleventh modification of the main body of the same string fastening device.
Figure 39:
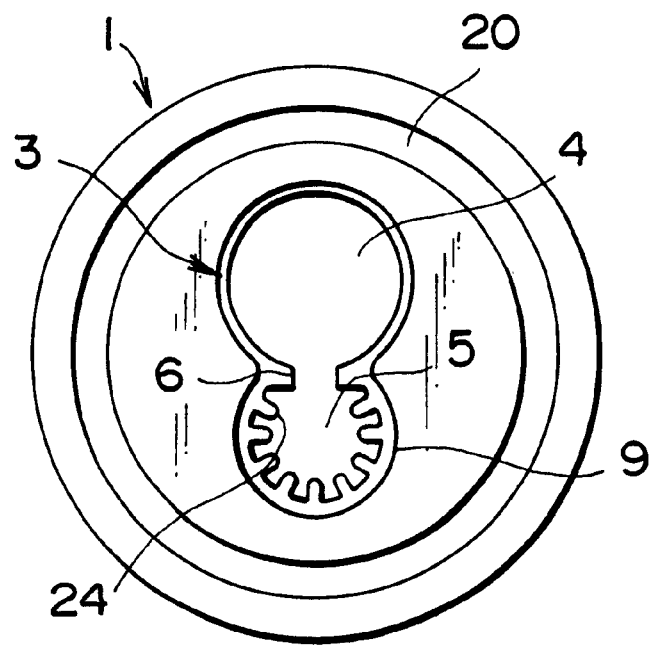
FIG. 39 is a front view showing a twelfth modification of the main body of the same string fastening device.
Figure 40:
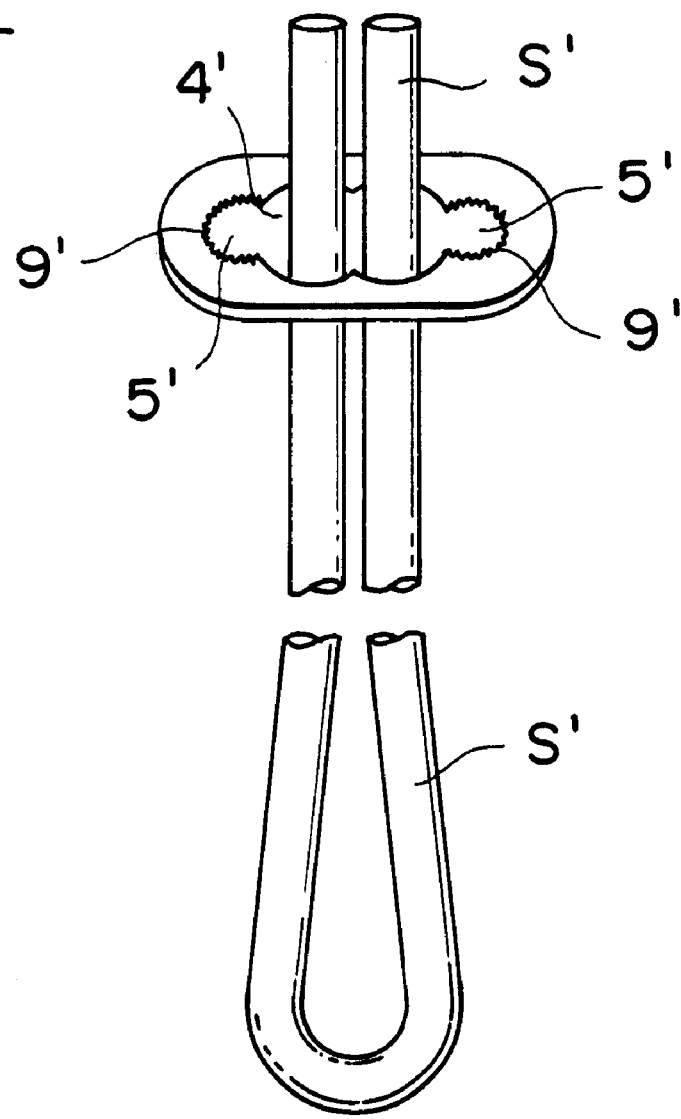
FIG. 40 is a perspective view of a first well known string fastening device.
Figure 41:
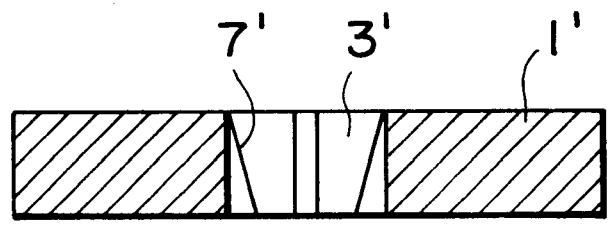
FIG. 41 is a cross sectional view of a second well known string fastening device.
Figure 42:
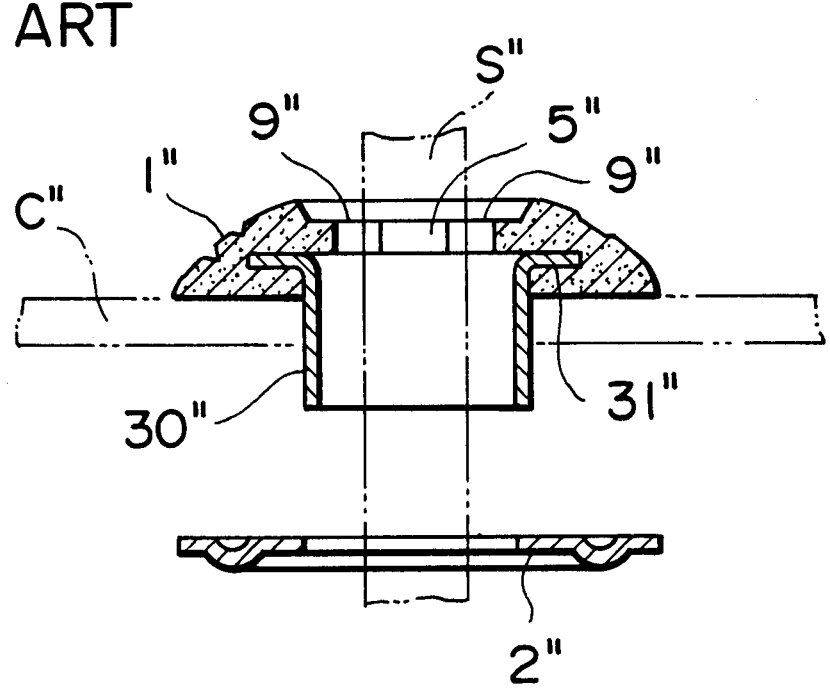
FIG. 42 is a cross sectional view of a third well known string fastening device.

The string fastening devices in FIGS. 38 and 39 shows modifications of the main body 1 in which the braking passage portion 5 can be elastically deformed. In FIG. 38, the penetrating hole 3 is formed substantially in the center of the general flat oval plate-like main body 1 to define the sliding passage portion 4, the braking passage portion 5 and then arrow portion 6. Tongue-shaped deformable elastic pieces 24 are provided to protrude inwardly from the surface of the braking passage portion 5 so as to provide elasticity for elastically holding the string S threaded through the braking passage portion 5. Thus the main body 1 has flexibility with respect to the string S to be threaded. Besides, the attachment groove 20 of recess shape section is formed in the front face of the main body along its outer periphery.

In FIG. 39, the penetrating hole 3 is formed substantially in the center of the generally circular plate-like main body 1 to define the sliding passage portion 4, the braking passage portion 5 and the narrow portion 6. The braking passage portion 5 is substantially circular in a plan view and a plurality of tongue-like elastic pieces 24 protrude from the surface of the braking passage portion 5 to provide elasticity, so as to flexibly hold the string S threaded. The attachment groove 20 of recess shape section is formed in the main body 1 to facilitate sewing by machine along the outer periphery. Thus the main body 1 can be attached to the cloth C neatly. Also, it is preferable to use thermoplastic elastomer as the material of the main body 1 of FIGS. 38 and 39.

The string fastening device of the present invention has the structure as described above and thereby providing the following effects.

According to the invention, there is provided the string fastening device, wherein the main body 1 thereof has the penetrating hole 3 in which the string S is capable of being threaded; the penetrating hole 3 is comprised of the sliding passage portion 4 allowing the string S to be moved freely and the braking passage portion 5 for restricting motion of the string S such that they adjoin each other; the inner face of the braking passage portion 5 is formed in the tapered face 7 narrowing gradually; and the engaging portion 9 having the section of an acute angle is formed at the edge of the tapered face 7. As a result, the sliding passage portion 4 allowing the string S to be moved freely and the braking passage portion 5 for restricting movement of the string S are provided in the main body 1 separately. Thus, adjustment function for the string can be exerted securely and tightening operation can be carried out very effectively and simply.

According to the invention, the main body 1 of the string fastening device includes the penetrating hole 3 through which the string S can be threaded and which is comprised of the sliding passage portion 4 allowing the string to move freely and the braking passage portion 5 for restricting the movement of the string S, the main body 1 is fixed to the cloth, and the penetrating hole 3 communicates with the string threading hole H formed in the cloth C. As a result, the sliding passage portion 4 for allowing the string S to move freely and the braking passage portion 5 for restricting the movement of the string S are provided independently in the main body 1, thus the adjustment of the string S can be done reliably and the main body 1 can be attached to the article by its own.

According to the invention, the engaging portion 9 is formed in the inner surface of the restricting passage portion 5 in the main body 1. As a result, the restricting passage portion 5 can grip and capture the string S reliably and easily.

According to the invention, the narrow portion 6 is formed at the joint portion between the sliding passage portion 4 and the braking passage portion 5 provided in the main body 1 by narrowing the entrance of the braking passage portion 5. Consequently, in addition to the foregoing effect, the string S cannot change its path freely. Further, if it is intended to change its path intentionally, the path of the string can be changed smoothly without damaging the string.

According to the invention, the sliding passage portion 4 provided in the main body 1 is formed in the circular shape in its plan view and the braking passage portion 5 is formed in the oval shape having a smaller width than the sliding passage portion 4. Alternatively, the sliding passage portion 4 provided in the main body 1 is formed in the large circle in its plan view and the braking passage portion 5 is formed in the smaller circle than the sliding passage portion 4 in its plan view. Consequently, the string fastening device having a shape appropriate for purpose can be made depending on material and shape of the string used. Thus, the produced string fastening device can grip and capture a flat string, a round string and the like effectively.

According to the invention, the concave stepped portion 8 is provided outside the engaging portion 9 provided on an edge of the braking passage portion 5 being wider than the engaging portion 9, so that the engaging portion 9 is disposed halfway of the tapered face 7. Consequently, the string S threaded into the braking passage portion 5 is tightened and gripped in a stable condition due to provision of the stepped portion 8.

According to the invention, the string fastening device is comprised of the main body 1 and the fastening body 2 to be connected with the main body 1 with the engaging portion 9 located outside; the fastening body 2 has the through hole 13 communicating with the penetrating hole 3 in the main body 1; the attaching posts 10 are provided on any one of opposing faces of the main body 1 and the fastening body 2; and the attaching holes 14 are made in the other one so that the attaching posts 10 engages. Consequently, the string fastening device can be fixed to a cloth for use in a simple manner and further, the main body 1 and the fastening body 2 can be connected with each other securely and strongly. Depending on use condition, this can be used easily as just a single unit of string fastening device.

According to the invention, the plural small protrusions 11 are disposed on opposing faces around the attaching posts 10 and attaching holes 14 provided in the main body 1 and the fastening body 2 such that the small protrusions 11 provided on both sides stagger from each other. Also, the plural coupling protrusions 12 provided on the opposing faces of the main body 1 and the fastening body 2 are formed such that they stagger from each other. Alternatively, the plural convex portions 16 and concave portions 17 are formed on opposing faces of the main body 1 and the fastening body 2. Consequently, when fixing the string fastening device on a cloth, the cloth C at an attaching position is never slid during use, so that it can be fixed in a stable condition. Thus, a highly durable string fastening device can be produced.

According to the invention, the protruded row 18 is provided along the periphery of the through hole 13 provided in the fastening body 2 such that it is protruded against the main body 1. Consequently, the yarns existing around the through hole 13 in the cloth C where the string fastening device is attached never go out into the penetrating hole 3 in the fastening device, so that the adjustment operation can be carried out effectively and smoothly for a long term.

According to the invention, the rear face of the main body 1 is flat and the sewing holes 21 or the attachment groove 22 or both of them are provided on the outside of the sliding passage portion 4 on the front face thereof. As a result, the main body 1 can be used solely and the main body 1 can be sewn onto the article easily and accurately while being held stably on the article.

According to the invention, the protruding portion 26 is provided to protrude on the flat surface of the rear face of the main body 1 so as to prevent displacement. As a result, the simply structured protruding portion 26 of the main body 1 bites into the cloth C at the time of sewing of the main body 1 onto the cloth C using sewing means, preventing displacement of the main body 1.

According to the invention, the small holes 23 are formed in the vicinity of the braking passage portion 5 in the main body 1 to provide elasticity to the braking passage portion 5, or the plurality of elastic pieces 24 are provided to protrude from the inner surface of the braking passage portion 5 to provide flexibility. As a result, the braking passage portion 5 is provided with elasticity or flexibility so as to press the string S flexibly to restrict its movement and to protect the string S.

According to the invention, the main body 1 and the fastening body 2 thereof are formed by injection molding or extrusion using thermoplastic resin. Consequently, the string fastening device can be produced very easily and recycled thereby contributing to saving of natural resource.

According to the invention, the main body 1 is molded of thermoplastic elastomer to provide elasticity to the main body 1. As a result, the main body 1 which can be used solely has elasticity and flexibility, the string S does not get damaged, and the device is soft to the touch. Thus the application of the device can be expanded. As described above, the advantages which the present invention achieves are very remarkable.

What is claimed is:

1. A cloth to which a string fastening device is attached, the string fastening device comprising a main body having a sliding passage portion allowing a string to be moved freely and a braking passage portion for restricting motion of the string, wherein the sliding passage portion and the braking passage portion adjoin each other, wherein a narrow portion is formed at a joint portion between the sliding passage portion and the braking passage portion by narrowing an entrance of said braking passage portion, and wherein said cloth has a string threading hole which corresponds in position to said sliding passage portion and braking passage portion.

2. A cloth according to claim 1, wherein an engaging portion is formed in an inner face of the braking passage portion provided in the main body.

3. A cloth according to claim 1, wherein the sliding passage portion provided in the main body is formed in a circular shape in its plan view and the braking passage portion is formed in an oval shape having a smaller width than that of said sliding passage portion in its plan view.

4. A cloth according to claim 1, wherein the sliding passage portion provided in the main body is formed in a large circle in its plan view and the braking passage portion is formed in a smaller circle than that of said sliding passage portion in its plan view.

5. A cloth according to claim 1, wherein a concave stepped portion is provided outside the engaging portion provided on an edge of the braking passage portion by enlarging the braking passage portion so that said engaging portion is disposed halfway of said braking passage portion.

6. A cloth according to claim 1, wherein said string fastening device is comprised of the main body and a fastening body to be connected with said main body with the engaging portion located outside; said fastening body has a through hole communicating with the penetrating hole in the main body; attaching posts are provided on any one of opposing faces of the main body and the fastening body; and attaching holes are made in the other one so that said attaching posts engages.

7. A cloth according to claim 6, wherein plural small protrusions are disposed on opposing faces around the attaching posts and attaching holes provided in the main body and the fastening body such that said small protrusions provided on both sides stagger from each other.

8. A cloth according to claim 6, wherein plural coupling protrusions provided on the opposing faces of the main body and the fastening body are formed such that they stagger from each other.

9. A cloth according to claim 6, wherein plural convex portions and concave portions are formed on opposing faces of the main body and the fastening body in a complementary manner.

10. A cloth according to claim 6, wherein a protruded row is provided along a periphery of the through hole provided in the fastening body such that it is protruded against the main body.

11. A cloth according to claim 6, wherein the main body and the fastening body thereof are formed by injection molding or extrusion molding using thermoplastic resin.

12. A cloth according to claim 1, wherein a small hole is formed in the vicinity of the braking passage portion formed in the main body so as to provide elasticity to said braking passage portion.

13. A cloth according to claim 1, wherein a plurality of elastic pieces are provided to protrude from inner face of the braking passage portion formed in the main body so as to provide flexibility.

14. A cloth according to claim 1, wherein the main body is formed of elastomer so as to provide elasticity to the main body.

15. A cloth according to claim 1, wherein a rear face of said main body is formed to be a flat face and at least one of sewing holes or an attachment groove for sewing operation are provided on a front face of said main body outside of said sliding passage portion and said braking passage portion.

16. A cloth according to claim 15, wherein a protruding portion for preventing displacement is provided to protrude from said flat face on the rear of the main body.

* * * * *